(12) United States Patent
Hirahara

(10) Patent No.: US 11,161,240 B2
(45) Date of Patent: Nov. 2, 2021

(54) COMMODITY TAKE-OUT APPARATUS

(71) Applicant: TOSHIBA TEC KABUSHIKI KAISHA, Tokyo (JP)

(72) Inventor: Yoshiyuki Hirahara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 16/503,306

(22) Filed: Jul. 3, 2019

(65) Prior Publication Data
US 2020/0147792 A1 May 14, 2020

(30) Foreign Application Priority Data
Nov. 14, 2018 (JP) .............................. JP2018-213735

(51) Int. Cl.
| | | |
|---|---|---|
| *B25J 9/16* | (2006.01) | |
| *B25J 9/06* | (2006.01) | |
| *B25J 11/00* | (2006.01) | |
| *B25J 15/10* | (2006.01) | |

(52) U.S. Cl.
CPC .............. *B25J 9/1612* (2013.01); *B25J 9/06* (2013.01); *B25J 9/1697* (2013.01); *B25J 11/008* (2013.01); *B25J 15/10* (2013.01)

(58) Field of Classification Search
USPC ................................................ 700/245–264
See application file for complete search history.

(56) References Cited

U.S. PATENT DOCUMENTS

| | | | |
|---|---|---|---|
| 9,102,055 B1* | 8/2015 | Konolige | G06K 9/3208 |
| 10,399,778 B1* | 9/2019 | Shekhawat | G06Q 10/087 |
| 2006/0047361 A1* | 3/2006 | Sato | B25J 5/007 |
| | | | 700/245 |
| 2007/0284442 A1* | 12/2007 | Herskovitz | G06Q 20/18 |
| | | | 235/383 |

(Continued)

FOREIGN PATENT DOCUMENTS

| | | |
|---|---|---|
| CN | 106846632 A | 6/2017 |
| JP | 2001158507 A | 6/2001 |

(Continued)

OTHER PUBLICATIONS

Extended European Search Report dated Apr. 7, 2020, mailed in counterpart European Application No. 19187046.8, 102 pages.

*Primary Examiner* — Jonathan L Sample
(74) *Attorney, Agent, or Firm* — Kim & Stewart LLP

(57) ABSTRACT

In accordance with an embodiment, a commodity take-out apparatus includes a camera, an arm, a holding mechanism, and a controller. The controller determines a reference position in the take-out target commodity on the basis of the image acquired by the camera, determines positions of the both side surfaces of the take-out target commodity on the basis of a size of the take-out target commodity, using the reference position as a reference. The arm and the holding mechanism are operated by the controller to thereby move the holding member of the holding mechanism on both lateral sides of the take-out target commodity on the basis of the determined positions of the both side surfaces of the take-out target commodity and cause the holding member to hold the take-out target commodity.

11 Claims, 13 Drawing Sheets

(56) References Cited

U.S. PATENT DOCUMENTS

| | | | | |
|---|---|---|---|---|
| 2013/0245824 | A1* | 9/2013 | Barajas | B25J 9/1664 700/253 |
| 2015/0217450 | A1* | 8/2015 | Huang | B25J 9/1671 700/259 |
| 2015/0274447 | A1* | 10/2015 | McCollum | B25J 15/10 414/792.6 |
| 2016/0008988 | A1* | 1/2016 | Kennedy | B25J 9/06 414/738 |
| 2018/0111765 | A1* | 4/2018 | Wicks | B65G 67/24 |
| 2018/0111769 | A1* | 4/2018 | Yuvaraj | B25J 15/00 |
| 2018/0178386 | A1 | 6/2018 | Eto et al. | |
| 2018/0272535 | A1* | 9/2018 | Ogawa | B25J 19/023 |
| 2018/0286119 | A1* | 10/2018 | Felip Leon | G01L 5/009 |
| 2018/0290307 | A1* | 10/2018 | Watanabe | B25J 9/1676 |
| 2018/0361589 | A1* | 12/2018 | Paquin | B25J 9/1692 |
| 2019/0217477 | A1* | 7/2019 | Paepcke | G06F 3/017 |
| 2019/0321977 | A1* | 10/2019 | Tan | B25J 9/162 |
| 2020/0147792 | A1* | 5/2020 | Hirahara | B25J 19/023 |
| 2021/0080965 | A1* | 3/2021 | Starr | B25J 19/021 |

FOREIGN PATENT DOCUMENTS

| | | |
|---|---|---|
| JP | 2007109072 A | 4/2007 |
| JP | 2016167246 A | 9/2016 |
| JP | 2018158439 A | 10/2018 |
| WO | 2016100235 A1 | 6/2016 |

* cited by examiner

| COMMODITY MANAGEMENT DB ||||||
|---|---|---|---|---|---|
| CLASSIFI-CATION | COMMODITY ID | COMMODITY NAME (BRAND NAME) | SALE CONDITION | PRICE | STORE STOCK |
| . | . | . | . | . | . |
| . | . | . | . | . | . |
| . | . | . | . | . | . |

Fig.4

| SHELF MANAGEMENT DATA BASE | | | | | | | | |
|---|---|---|---|---|---|---|---|---|
| CLASSIFI-CATION | COMMODITY ID | COMMODITY NAME (BRAND NAME) | SHELF NUMBER | SHELF STOCK | SALE CONDITION | SIZE (h, w, d) | ARRANGEMENT POSITION | MOVEMENT ROUTE |
| . | . | . | . | . | . | . | . | . |
| . | . | . | . | . | . | . | . | . |
| . | . | . | . | . | . | . | . | . |

COMMODITY TAKE-OUT APPARATUS

CROSS-REFERENCE TO RELATED APPLICATION

This application is based upon and claims the benefit of priority from the prior Japanese Patent Application No. 2018-213735, filed on Nov. 14, 2018, the entire contents of which are incorporated herein by reference.

FIELD

An embodiment described here generally relates to a commodity take-out apparatus.

BACKGROUND

In recent years, it is desirable to achieve power saving or full automation of a task for selling commodities to customers at a store because of manpower shortage and the like. In the related art, regarding certain kinds of commodities, a customer tells an employee at a store about a commodity that the customer wishes to purchase and the employee delivers the commodity that the customer wishes to purchase by hand as one of sale styles. For example, regarding commodities such as cigarettes and alcoholic drinks, at many stores, an employee verifies customer's age and the like and delivers a commodity to a customer as an operation for the purpose of preventing those commodities to be sold to a minor. Further, commodities such as cigarettes are often arranged at a place that customers cannot reach, such as a shelf at the back of a cash register.

When an employee receives an order to purchase such a commodity from a customer, the employee verifies customer's age and the like in a manner that depends on needs and takes out the commodity that the customer wishes to purchase from a shelf at the back of a cash register. Further, at some stores, an employee inputs information regarding a commodity taken out from the shelf at the back of a cash register into a payment apparatus as payment target commodity information as an operation. At a store employing such an operation, an employee completes payment processing at a payment apparatus into which commodity information has been input and then delivers the commodity to a customer. There is thus a problem that the work of selling a commodity taken out in accordance with an order from a customer is a heavy burden on an inexperienced employee.

BRIEF DESCRIPTION OF THE DRAWINGS

FIG. 4 is a diagram showing a configuration example of a commodity management database to be referenced by the robot that is the commodity take-out apparatus according to the embodiment.

FIG. 5 is a diagram showing a configuration example of a shelf management database to be referenced by the robot that is the commodity take-out apparatus according to the embodiment.

DETAILED DESCRIPTION

In accordance with one embodiment, a commodity take-out apparatus is configured to move a take-out target commodity of a plurality of commodities which is arranged at a commodity arrangement position from the commodity arrangement position to a predetermined destination position. The apparatus includes a camera, an arm, a holding mechanism, and a controller. The camera captures an image of an image-capturing area including the take-out target commodity and acquires an image of the take-out target commodity. The arm includes a distal end portion that is three-dimensionally movable between the commodity arrangement position and a predetermined destination position. The holding mechanism is provided to the distal end portion of the arm. The holding mechanism includes a holding member. The holding member holds the take-out target commodity from both side surfaces. The controller determines a reference position in the take-out target commodity on the basis of the image acquired by the camera. The controller determines positions of the both side surfaces of the take-out target commodity on the basis of a size of the take-out target commodity, using the reference position as a reference. In addition, the controller operates the arm and the holding mechanism to thereby move the holding member of the holding mechanism on both lateral sides of the take-out target commodity on the basis of the determined positions of the both side surfaces of the take-out target commodity and cause the holding member to hold the take-out target commodity.

Figure 1:
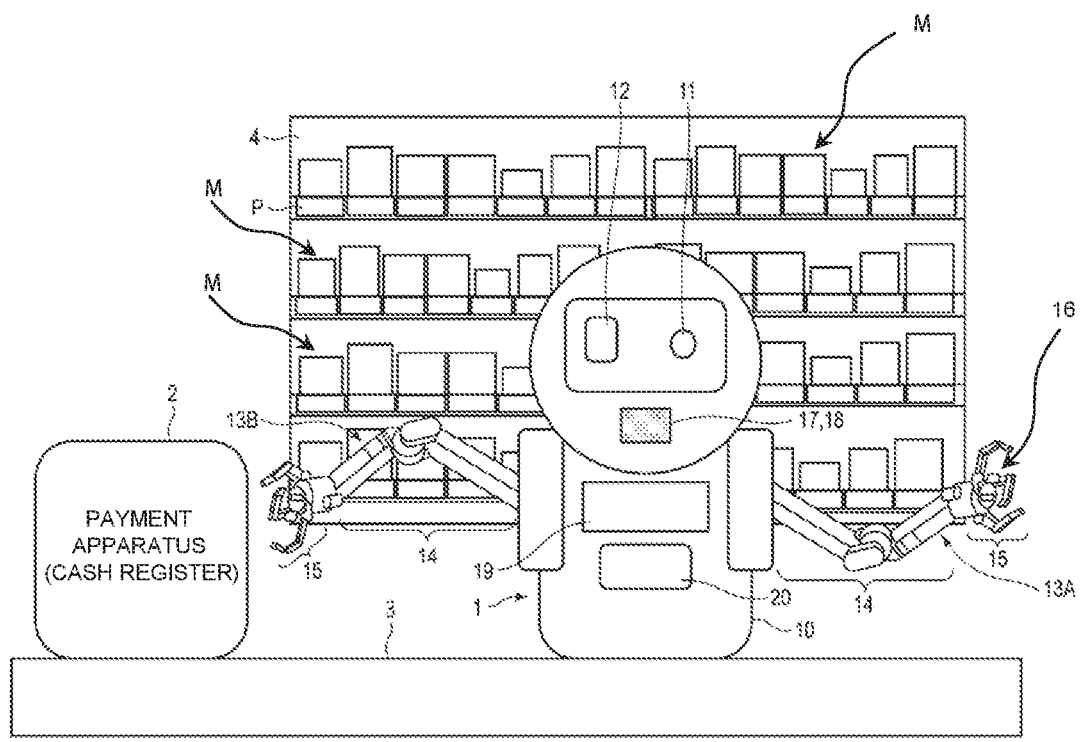
FIG. 1 is a diagram schematically showing a mounting example of a robot that is a commodity take-out apparatus according to an embodiment.

Hereinafter, a commodity take-out apparatus according to an embodiment will be further described with reference to the drawings. In the drawings, identical symbols denote identical or similar parts. FIG. 1 is a schematic view schematically showing an outer appearance configuration of a commodity take-out apparatus (robot) 1 according to the embodiment and a transaction system including this commodity take-out apparatus 1 and a payment apparatus 2. The commodity take-out apparatus (hereinafter, simply also referred to as the robot) 1 is an apparatus that takes out one of commodities M which is specified by a customer (user) from a predetermined commodity arrangement position and moves the commodity M to a predetermined destination position. In the configuration example shown in FIG. 1, the robot 1 is placed between a cash register table 3 on which a payment apparatus (cash register) 2 is placed and a shelf 4 placed at the back of the cash register table 3. For example, the robot 1 has a humanoid outer appearance which looks like a human being, which is friendly to customers, and recognizes one of the commodities M, which the customer wishes to purchase, on the basis of voice uttered by a customer. The robot 1 takes out the recognized commodity M from the shelf 4.

At the back of the cash register table 3 at which the robot 1 is placed, the shelf 4 on which particular kinds of commodities M are arranged is placed. The commodities M arranged on the shelf 4 includes cigarettes, alcoholic drinks, and the like, for example. The shelf 4 is placed while an anterior surface (front surface) is oriented toward the cash register table 3. On the shelf 4, the identical commodities M are aligned and arranged from a front side (anterior side) to a deep side. Plates P are provided on the front surface of the shelf 4. Each of the plates P is provided at each position corresponding to an arrangement position (in a line) in which the commodities M are aligned and arranged. In other words, in the rear of each plate P of the shelf 4, the identical commodities M corresponding to the plate P are aligned and arranged.

A push-out mechanism (not shown) is provided at each arrangement position on the shelf 4, at which each plate P is provided. Every time a commodity M in the front (on the front side) at each arrangement position at which each plate P is provided is removed, the push-out mechanism pushes out a commodity M on the back side. The push-out mechanism keeps the commodity M (commodity on the front side) at the head of the line at each arrangement position in a state in which the push-out mechanism is pressed against the plate P. The push-out mechanism may be a mechanism that pushes out the commodity M at the end of the line foreword via an elastic member or may be a mechanism that causes respective commodities M to move foreword due to the own weight of the respective commodities M.

It should be noted that in this embodiment to be shown below, the description will be made mainly assuming a case where cigarettes in a box shape as shown in FIG. 1 are placed as the commodities M on the shelf 4. It should be noted that the commodities M arranged on the shelf 4 only need to be commodities M which can be taken out by the robot 1. For example, the commodities M arranged on the shelf 4 may be commodities each having a cylindrical shape such as a can, a bottle, and a plastic bottle.

The payment apparatus 2 is an apparatus that performs payment processing for the price of a commodity M to be purchased by the customer. In the configuration example shown in FIG. 1, the payment apparatus 2 mounted on the cash register table 3 is connected to the robot 1. The robot 1 and the payment apparatus 2 configure a transaction system for performing a task for paying for the commodity M. For example, when the robot 1 takes out the commodity M from the shelf 4 and places the taken out commodity M on the cash register table 3, the payment apparatus 2 acquires information (commodity information) indicating the commodity M placed on the cash register table 3 from the robot 1. When the payment apparatus 2 acquires the commodity information of the commodity M placed on the cash register table 3, the payment apparatus 2 performs payment processing on the basis of the acquired commodity information.

In the configuration example shown in FIG. 1, the robot 1 includes a main body 10, a sensor 11, a camera 12, a first arm 13A, a second arm 13B, an arm camera 16, a speaker 17, a microphone 18, a display device 19, and an information input device 20, and the like. The sensor 11, the camera 12, the speaker 17, the microphone 18, the display device 19, the information input device 20, and the like are provided on a front surface of the main body 10. Further, the first arm 13A and the second arm 13B are provided on left- and right-hand sides on left and right side surfaces of the main body 10. The main body 10 may include a mechanism capable of changing the direction. For example, the main body 10 is capable of orienting the front surface toward the cash register table 3 and is capable of orienting the front surface toward the shelf 4. Further, the main body 10 may include a moving mechanism. For example, the main body 10 may move toward the cash register table 3 or the shelf 4 in left- and right-hand directions.

The sensor 11 detects a person who is present in front of the main body 10. As shown in FIG. 1, if the main body 10 is oriented toward the cash register table 3, the sensor 11 detects a person who approaches the cash register table 3. The sensor 11 only needs to be a sensor capable of detecting the presence/absence of a person. For example, the sensor 11 is an infrared sensor that detects a person or a commodity M by using infrared rays.

The camera 12 captures an image of the front surface of the main body 10 which is an image-capturing area and acquires an image (image data) of the front surface of the main body 10. If the front surface of the main body 10 is oriented toward the cash register table 3, the camera 12 captures an image of a periphery of the cash register table 3 which is the image-capturing area and acquires an image of the periphery of the cash register table 3. Further, in a case where the front surface of the main body 10 is oriented to the shelf 4, the camera 12 captures an image of the shelf 4 which is the image-capturing area. Further, the camera 12 may have a function of adjusting an image-capturing direction, an image-capturing distance, or the like to thereby change the image-capturing area.

The first arm 13A and the second arm 13B each include an arm portion 14 and a holding mechanism 15. The arm portion 14 is an articulated arm mounted on the main body 10 of the robot 1. Hereinafter, the arm portion 14 will be sometimes referred to as the articulated arm 14. The holding mechanism 15 is a mechanism that holds a commodity M. The articulated arm 14 only needs to freely three-dimensionally move a holding position of the holding mechanism 15. For example, the holding mechanism 15 is provided to a distal end portion of each articulated arm 14. The first arm 13A and the second arm 13B move the articulated arms 14 through arm drive mechanisms 54 to be described later (see FIG. 3) in a state in which the holding mechanism 15 holds a commodity M. With this configuration, the first arm 13A and the second arm 13B perform an operation of taking out the commodity M arranged on the shelf 4.

Figure 2:
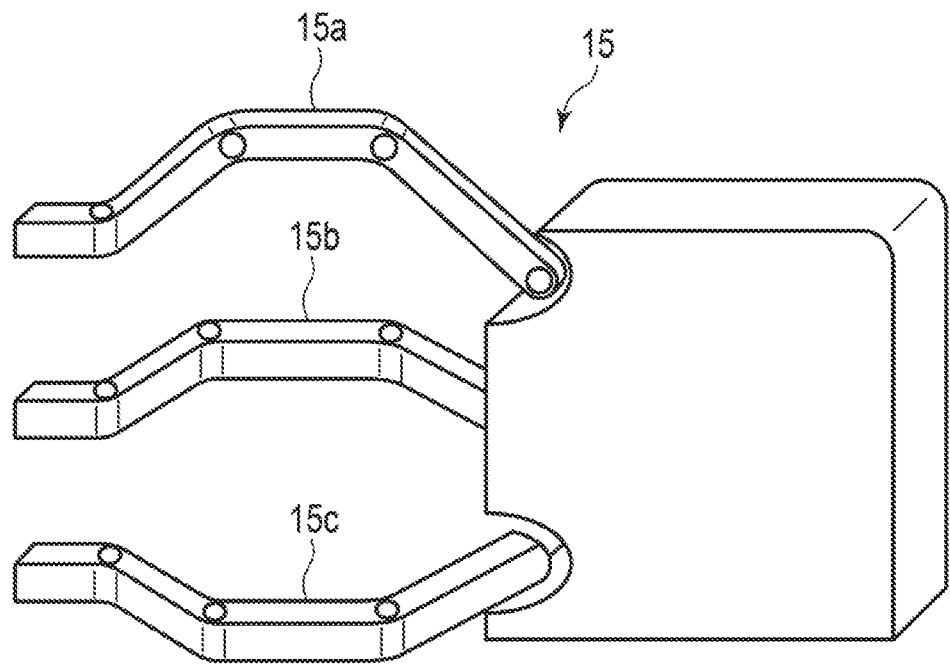
FIG. 2 is a diagram showing a configuration example of a holding mechanism provided to an arm of the robot that is the commodity take-out apparatus according to the embodiment.

FIG. 2 is a diagram showing a configuration example of the holding mechanism 15. In the configuration example shown in FIG. 2, the holding mechanism 15 includes a plurality of holding members. The holding member includes sandwiching members, for example. More specifically, the holding member includes articulated fingers 15a, 15b, and 15c. The respective fingers 15a, 15b, and 15c are operated by using a plurality of joints as support points. The respective fingers 15a, 15b, and 15c are operated to sandwich both side surfaces of a commodity M (take-out target commodity) to be a take-out target present on the shelf 4 while supporting an upper surface or a lower surface of the commodity M. The finger 15a of the holding mechanism 15 is a supporting member that supports the upper surface (or the lower surface) of the commodity M. Further, the fingers 15b and 15c are a pair of sandwiching members that sandwich the both side surfaces of the commodity M whose upper surface (or lower surface) is supported by the finger 15a. The finger 15b and the finger 15c sandwich the both side surfaces of the commodity M in a state in which the finger 15a is supporting the upper surface of the commodity M.

It should be noted that the holding member of the holding mechanism 15 is not limited to one including a plurality of fingers. The holding member of the holding mechanism 15 only needs to be one including the supporting member that supports the upper surface or the lower surface of the commodity M and the sandwiching members that sandwich the both side surfaces of the commodity M. Further, for example, distal end portions of the respective fingers 15a, 15b, and 15c may each include an adsorption mechanism that adsorbs the commodity M. In this case, it is sufficient that the adsorption mechanism controls adsorption to and desorption from the commodity M by changing the air pressure at an adsorption portion held in contact with an outer surface of the commodity M.

Further, the sandwiching members (fingers 15b and 15c) that sandwich the side surfaces of the commodity M may each have a shape depending on the shape of the side surface of the commodity M in a state in which the commodity M is arranged on the shelf 4. As a specific example, the sandwiching members to be used in the holding mechanism 15 may each have a semicircular shape depending on the shape of the side surface of the commodity M as long as the commodity M is a cylindrical can, bottle, or the like.

The arm camera 16 is a camera whose image-capturing position is freely movable in a three-dimensional space. In the configuration example shown in FIG. 1, the arm camera 16 is provided to a distal end portion of the first arm 13A and the image-capturing position is moved by an operation of the first arm 13A. It should be noted that the arm camera 16 may be provided to the second arm 13B and may be provided to both of the first arm 13A and the second arm 13B. Further, the arm camera 16 may be additionally provided as a camera that freely moves the image-capturing position, not as the first arm 13A or the second arm 13B. In this embodiment, the arm camera 16 captures an image of a range including a specified commodity M (or a commodity arrangement position) and acquires an image including the specified commodity M. An image acquired by image-capturing of the arm camera 16 is used for specifying a position at which the commodity M is actually present (actually exists). Further, an image acquired by image-capturing of the arm camera 16 is also used as an image for extracting commodity-specifying information for specifying the commodity M or information displayed on the plate.

It should be noted that the commodity-specifying information only needs to be information read from an outer appearance of the commodity M. For example, the commodity-specifying information is a barcode printed on the package of the commodity M. Alternatively, the commodity-specifying information may be a literal character string such as numeric characters and literal characters with which the commodity M can be identified. Alternatively, the commodity-specifying information may be an image of a label attached to the commodity M. Alternatively, the commodity-specifying information may be the entire silhouette of the commodity M or the like. The first arm 13A or the second arm 13B may be provided with an arm scanner that reads a barcode that is the commodity-specifying information. The arm scanner that reads the barcode only needs to read the barcode at a reading position moved by the first arm 13A or the second arm 13B.

The speaker 17, the microphone 18, the display device 19, and the information input device 20 function as a user interface. The speaker 17 outputs voice. For example, the speaker 17 outputs voice of guidance and the like to the user. The microphone 18 inputs voice. For example, the microphone 18 inputs voice uttered by the user. The speaker 17 and the microphone 18 may be an interactive apparatus that inputs and outputs voice in an interactive manner with the user.

The display device 19 displays an image. For example, the display device 19 displays guidance and the like to the user in the form of an image, a text, or the like. The information input device 20 is a device for inputting information. For example, the information input device 20 is a button for verifying user's age. Further, the information input device 20 may read a storage medium (ID card or the like) for verifying user's age, user's qualifications, or and the like.

Figure 3:
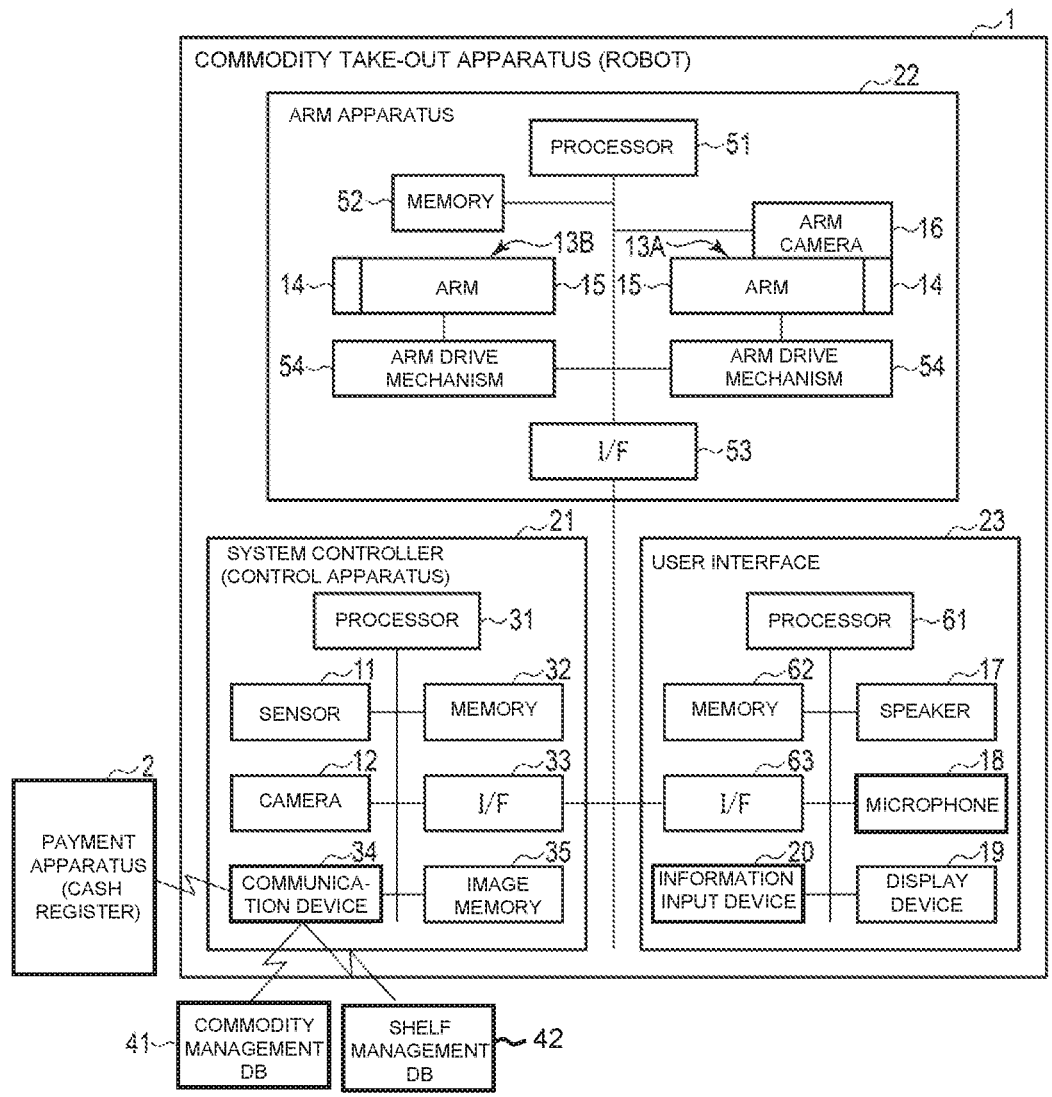
FIG. 3 is a block diagram showing a configuration example of a control system of the robot that is the commodity take-out apparatus according to the embodiment, which is an explanatory diagram showing an example of a data configuration of the apparatus.
Figure 6:
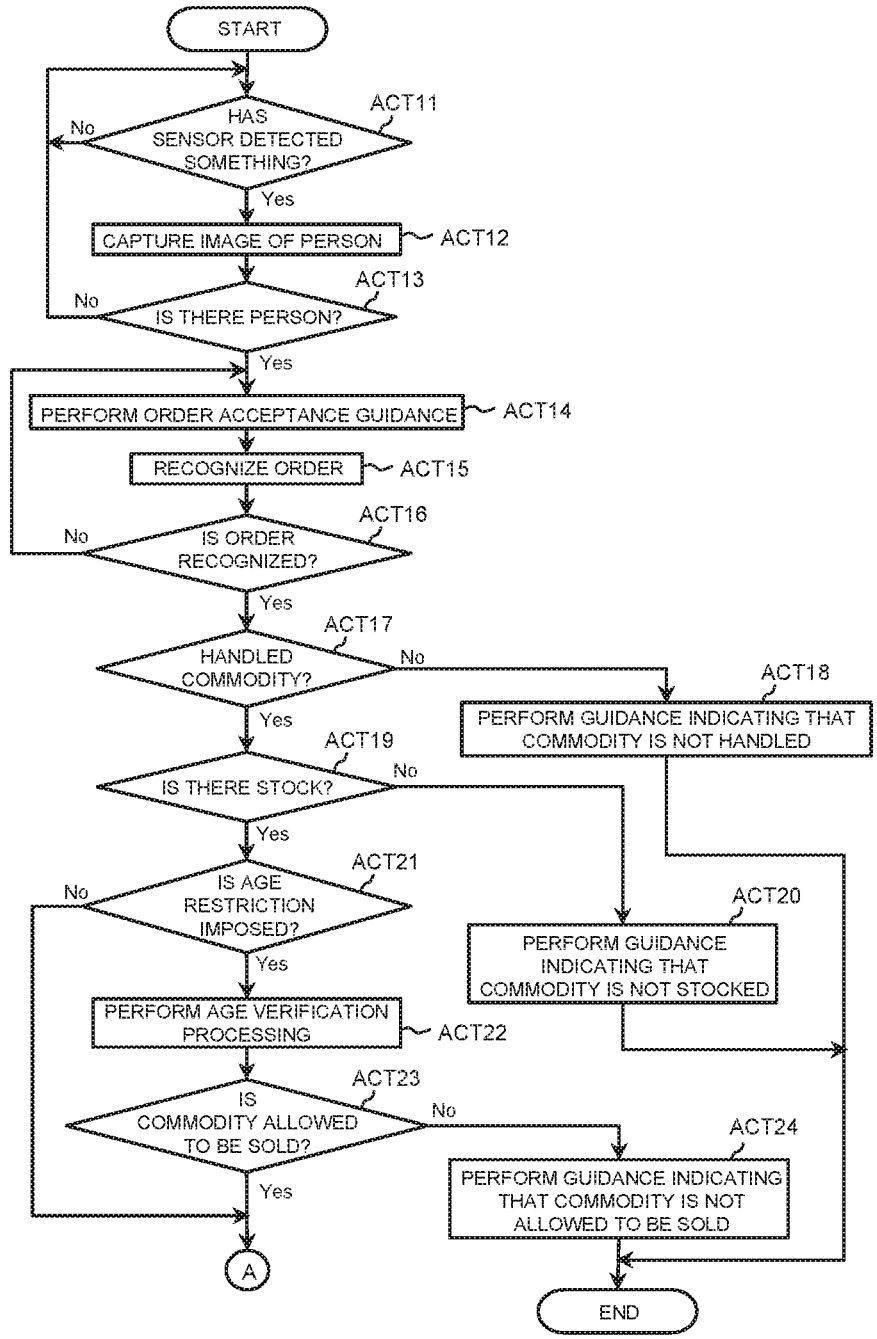
FIG. 6 is a flowchart showing an operation example of the robot that is the commodity take-out apparatus according to the embodiment.
Figure 7:
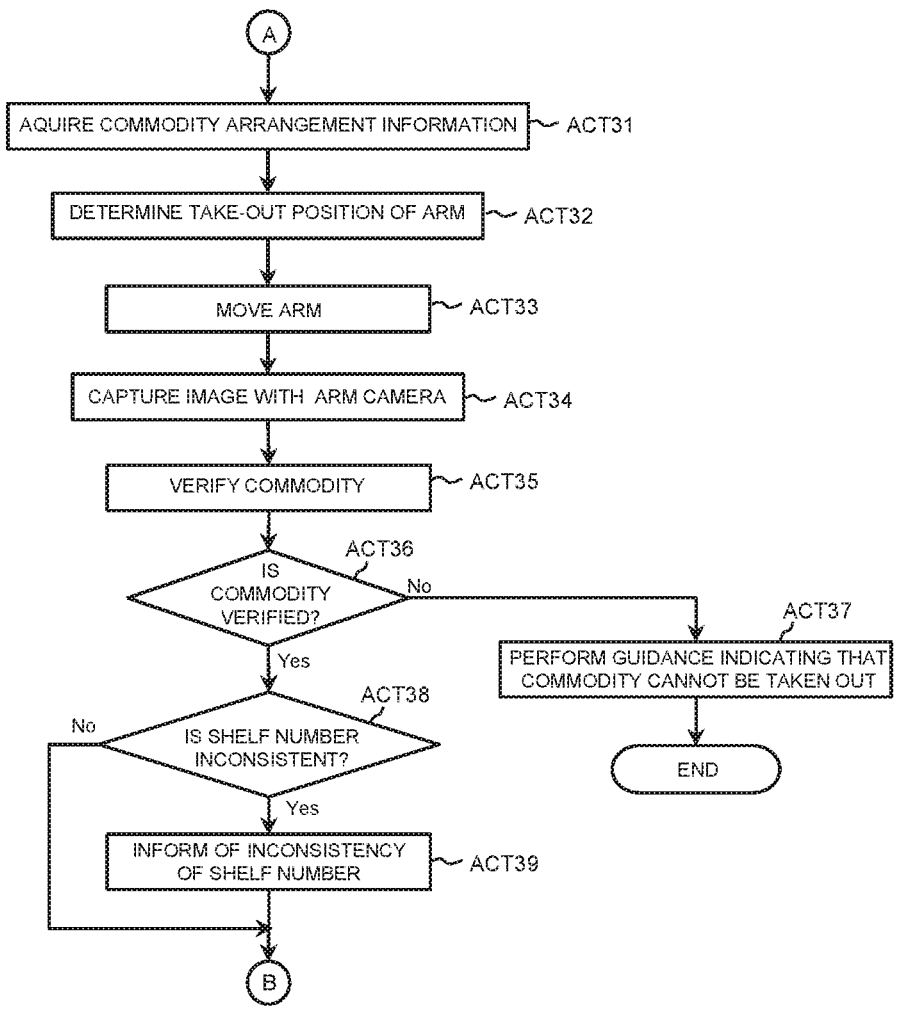
FIG. 7 is a flowchart showing an operation example of the robot that is the commodity take-out apparatus according to the embodiment.

Next, a configuration of a control system of the robot 1 that is the commodity take-out apparatus according to the embodiment will be described. FIG. 3 is a block diagram showing a configuration example of the control system of the robot 1 that is the commodity take-out apparatus according to the embodiment. In the configuration example shown in FIG. 3, the robot 1 is a system including a system controller (control apparatus) 21, an arm apparatus 22, and a user interface 23.

The system controller (controller) 21 comprehensively controls the respective apparatuses of the robot 1. In the configuration example shown in FIG. 2, a system controller 21 includes a processor 31, a memory 32, an interface (I/F) 33, a communication device 34, an image memory 35, the sensor 11, and the camera 12. The processor 31 executes various types of processing by executing a program. The processor 31 is a CPU, for example. The memory 32 includes a memory such as a ROM, a RAM, and a rewritable nonvolatile memory. For example, the memory 32 includes a nonvolatile memory that stores programs, control data, and the like. Further, the memory 32 includes a working memory such as a RAM for temporarily storing data.

The programs stored in the memory 32 include various application programs other than basic programs. The application programs include programs and the like for executing various types of processing to be described later. The processor 31 executes various types of processing to be to be described later by executing various programs to be stored in the memory 32. The interface (I/F) 33 communicates with the respective apparatuses of the robot 1.

The communication device 34 is a communication interface for communicating with an external apparatus. In the configuration example shown in FIG. 3, the communication device 34 includes an interface for communicating with the payment apparatus 2. Further, the communication device 34 also includes an interface for accessing various databases (DBs). In the configuration example shown in FIG. 3, the communication device 34 includes an interface for connecting to a commodity management database 41, and a shelf management database 42, and the like for communication. The commodity management database 41 is a database that stores information regarding commodities M handled at that store. The shelf management database 42 is a database that stores information regarding commodities M arranged on the shelf 4. It should be noted that databases including the commodity management database 41, the shelf management database 42, and thus may be stored in an internal storage device of the robot 1.

The sensor 11 detects a person. The sensor 11 is connected to the processor 31. The sensor 11 only needs to detect the presence/absence of a person in a detection range. The sensor 11 outputs a detection signal indicating a result of detection of the person to the processor 31. The camera 12 captures an image of a predetermined image-capturing area and acquires an image of the image-capturing area. The camera 12 is connected to the processor 31. The image acquired by image-capturing of the camera 12 is stored in the image memory 35. The camera 12 may include a camera drive mechanism that changes the direction (image-capturing direction) and the like in accordance with the control of the processor 31 as a function of controlling the image-capturing area. It should be noted that the robot 1 may include a camera interface for receiving an image acquired by image-capturing of an external camera of the robot 1 instead of the camera 12. In addition, the robot 1 may include a scanner that reads the commodity-specifying information such as a barcode shown on the commodity M.

In the system controller 21, the processor 31 executes various types of processing by executing the programs stored in the memory 32. For example, the memory 32 stores programs for giving, by the processor 31, control instructions to the respective apparatuses and acquiring information from the respective apparatuses. The processor 31 executes programs to thereby give control instructions to the respective apparatuses and acquire information from the respective apparatuses. For example, the processor 31 instructs the arm apparatus 22 to take out the commodity M on the shelf 4 by using the first arm 13A or the second arm 13B.

Further, the memory 32 stores programs for executing commodity determination processing of determining the commodity M. The processor 31 executes programs stored in the memory 32 to thereby execute commodity determination processing and the like. The processor 31 performs commodity determination processing of determining the commodity M in the image-capturing area of the arm camera 16 on the basis of the image acquired by image-capturing of the arm camera 16 as the commodity determination processing.

Further, the memory 32 may store programs for executing commodity determination processing of determining the commodity M and information recognition processing of recognizing information (number) displayed on the plate. With this configuration, the processor 31 detects commodity-specifying information such as a barcode from the image acquired by image-capturing of the arm camera 16 and executes commodity determination processing of determining (recognizing) the commodity M. Further, the processor 31 also executes information recognition processing of recognizing information shown on the plate fixed on the shelf 4 on the basis of the image acquired by image-capturing of the arm camera 16. Further, the processor 31 may perform processing of estimating characteristics (age and the like) of the user located in front of the cash register table 3 (in front of the cash register) on the basis of the image acquired by image-capturing of the camera 12.

Next, a configuration example of a control system of the arm apparatus 22 in the robot 1 will be described. In the configuration example shown in FIG. 3, the arm apparatus 22 includes a processor 51, a memory 52, an interface (I/F) 53, first and second arms 13A and 13B, the arm drive mechanisms 54, an arm camera 16, and the like.

The processor 51 executes various types of processing by executing programs. The processor 51 is a CPU, for example. The memory 52 includes a memory such as a ROM, a RAM, and a rewritable nonvolatile memory. For example, the memory 52 includes a nonvolatile memory that stores programs, control data, and the like. Further, the memory 52 includes a working memory such as a RAM for temporarily storing data.

The interface (I/F) 53 is an interface for communicating with the system controller 21. In this embodiment, the processor 51 controls the respective units in accordance with a control instruction supplied from the processor 31 of the system controller 21 via the interface 53.

Each of the arm drive mechanisms 54 operates the articulated arm 14 and the holding mechanism 15. That is, the first arm 13A and the second arm 13B include the articulated arms 14 and the holding mechanisms 15 and are operated by the arm drive mechanisms 54. For example, the arm drive mechanism 54 operates the articulated arm 14 in accordance with an operation instruction from the system controller 21 and moves the holding mechanism 15 to a holding position. Further, the arm drive mechanism 54 operates the holding mechanism 15 in accordance with an instruction from the system controller 21 and causes the holding mechanism 15 to hold the commodity M.

Further, the arm drive mechanism 54 operates the articulated arm 14 in accordance with an instruction from the system controller 21 and moves the commodity M held by the holding mechanism 15 to a delivery position (on the cash register table 3). That is, the arm drive mechanism 54 is capable of causing the holding mechanism 15 to hold the commodity M arranged on the shelf 4 in accordance with an instruction from the system controller 21 and moving the held commodity M to the delivery position. Further, the arm drive mechanism 54 operates the articulated arm 14 in accordance with an instruction from the system controller 21 and moves the position of the arm camera 16 provided to the distal end portion of the articulated arm 14.

Next, a configuration example of the control system of the user interface (UI) 23 in the robot 1 will be described. The user interface 23 provides the user with information as audio, an image, or the like. Further, the user interface 23 inputs information from the user and outputs information as a response to the input information. The user interface (UI) 23 recognizes voice uttered by the user and also functions as an interactive apparatus that outputs voice guidance.

In the configuration example shown in FIG. 3, the user interface 23 includes a processor 61, a memory 62, an interface (I/F) 63, the speaker 17, the microphone 18, the display device 19, the information input device 20, and the like.

The processor 61 executes various types of processing by executing programs. The processor 61 is a CPU, for example. The memory 62 includes a memory such as a ROM, a RAM, and a rewritable nonvolatile memory. The interface (I/F) 63 is an interface for communicating with the system controller 21.

The processor 61 outputs voice through the speaker 17 in accordance with an instruction and the like from the system controller 21. Further, the processor 61 supplies audio information input into the microphone 18 to the system controller 21. With this configuration, the processor 61 inputs and outputs voice in an interactive manner with the user through the speaker 17 and the microphone 18. Further, the processor 61 displays information on the display device 19 in accordance with an instruction and the like from the system controller 21. Further, the processor 61 acquires information input into the information input device 20.

It should be noted that the robot 1 which is the commodity take-out apparatus may be an apparatus integral with the payment apparatus 2. Further, the robot 1 may have a function of performing payment processing for the price of the commodity M. In addition, the robot 1 may have a settlement function by a credit card, electronic money, or the like. In this case, the robot 1 is enabled to perform not only take-out of the commodity M but also settlement of the amount of the taken out commodity M by a credit card, electronic money, or the like. For example, the robot 1 may take out the commodity M specified by the customer and deliver the commodity M to the customer after settlement is completed. Further, the robot 1 may perform take-out of the commodity M after settlement of the commodity M specified by the customer is completed.

Next, the commodity management database 41 and the shelf management database 42 will be described. FIG. 4 is a diagram showing a configuration example of the commodity management database 41. The commodity management database 41 stores information regarding the commodity M handled at the store where the shelf 4 is placed. In the example shown in FIG. 4, the commodity management database 41 stores information regarding classification, a commodity ID, a commodity name (brand name), a sale condition, a price, store stock, and the like with respect to each commodity M handled at the store where the shelf 4 is placed.

The classification is information indicating classification of the commodity M. The commodity ID is identification data for identifying the commodity M. The commodity name (brand name) is information indicating the name of the commodity M. The sale condition indicates a condition for selling the commodity M. For example, regarding an age restricted commodity M, the age to sell is stored as the sale condition. The price is information indicating the price of the commodity M. The store stock is information indicating stocks stored in the store. The store stock is information indicating the number of stocks, for example.

FIG. 5 is a diagram showing a configuration example of the shelf management database 42. The shelf management database 42 stores information regarding the commodity M arranged on the shelf 4. In the example shown in FIG. 5, the shelf management database 42 stores information regarding classification, a commodity ID, a commodity name (brand name), a shelf number, shelf stock, a sale condition, a size, an arrangement position, a movement route, and the like with respect to each commodity M arranged on the shelf 4.

The classification is information indicating classification of the commodity M. The commodity ID is identification data for identifying the commodity M. The commodity name (brand name) is information indicating the name of the commodity M. The shelf number indicates a number set to a place where the commodity M is arranged. The shelf number is a number set for each commodity M. Further, the shelf number includes a number (plate number) displayed on the plate P fixed corresponding to the arrangement position at which the commodity M is arranged. The shelf stock is information indicating whether or not the commodity M is present on the shelf 4. Further, the shelf stock may be information indicating the number of commodities M which should be present on the shelf 4.

The sale condition indicates a condition for selling the commodity M. For example, regarding the age restricted commodity M, the age to sell is stored as the sale condition. The size is information indicating the size of the commodity M. For example, the size indicates a height h, a width w, and a depth d in a state in which the commodity M is arranged on the shelf 4 (see FIG. 11). Further, a size from a predetermined reference position may be stored as the size. For example, information indicating a height from an upper end portion of the plate P to the upper surface of the commodity M may be stored as the size.

The arrangement position is information indicating a position at which the commodity M is arranged. The arrangement position may be coordinates in a three-dimensional space or may be two-dimensional coordinates on the anterior surface (front surface) of the shelf 4. The movement route is information indicating a route for moving the first arm 13A from the stand-by position to a take-out position (to be described later) corresponding to the arrangement position. The movement route may be additionally written every time the take-out processing is executed. Alternatively, the movement route may be updated to the latest route.

Next, an operation of the robot 1 that is the commodity take-out apparatus according to the embodiment will be described. FIGS. 6 to 9 are flowcharts for describing an operation example of the robot 1 that is the commodity take-out apparatus according to the embodiment. First of all, in ACT11 of FIG. 6, the processor 31 of the system controller 21 in the robot 1 monitors the presence/absence of a person by using the sensor 11 using the vicinity of the cash register table 3 as a detection range under a stand-by state. When the sensor 11 detects a person (YES in ACT11), the processing of the processor 31 shifts to ACT12. In ACT12, the processor 31 operates the camera 12 using the periphery of the cash register table 3 as the image-capturing area (image-capturing area for detecting a person) and causes the camera 12 to capture an image of the periphery of the cash register table 3. The image-capturing area of the camera 12 for detecting a person only needs to be such an image-capturing area that an image of a person detected by the sensor 11 or a person who appears in front of the cash register table 3 for paying for the commodity M, for example, can be captured.

For example, the processor 31 sets the camera 12 to use the region including the space in front of the cash register table 3 as the image-capturing area for detecting a person. Further, the processor 31 may estimate a position of a person detected by the sensor 11 and control the direction, the position, and the like of the camera 12 in accordance with the position of the estimated person. It should be noted that the processor 31 may cause the image memory 35 to save an image acquired by image-capturing of the camera 12. Further, the processor 31 may cause the image memory 35 to save a plurality of images acquired by continuous image-capturing of the camera 12.

When the camera 12 captures an image of the periphery of the cash register table 3 and the image of the periphery of the cash register table 3 is acquired, the processing of the processor 31 shifts to ACT13. In ACT13, the processor 31 determines whether or not a person who is the user is present in the image of the periphery of the cash register table 3 which is acquired by the camera 12. With this configuration, the processor 31 is capable of detecting the user present in the vicinity of the cash register table 3 from the image of the periphery of the cash register table 3 which is acquired by the camera 12. The processor 31 determines whether or not the user is present in the vicinity of the cash register table 3 on the basis of a detection result of the user from the image acquired by image-capturing of the camera 12. If the processor 31 determines that the user is not present in the vicinity of the cash register table 3 (NO in ACT13), the processing of the processor 31 returns to ACT11 for executing the above-mentioned processing again.

If the processor 31 determines that the user is present in the vicinity of the cash register table 3 (YES in ACT13), the processing of the processor 31 shifts to ACT14. In ACT14, the processor 31 performs guidance for the user via the user interface 23. For example, the processor 31 causes the speaker 17 of the user interface 23 to output voice of salutation, for example, "Hello".

In addition, the processor 31 may cause the speaker 17 to output voice of order acceptance guidance indicating to accept an order of the commodity M on the shelf 4. For example, the processor 31 may cause the speaker 17 to output voice guidance, for example, "Accepting the order of the commodity (cigarettes) on the shelf. Please say the number of the plate (nameplate) corresponding to a desired commodity name or commodity". Further, the processor 31 may cause the display device 19 of the user interface 23 to display the order acceptance guidance.

When the order acceptance guidance to the user is performed via the user interface 23, the processing of the processor 31 shifts to ACT15. In ACT15, the processor 31 performs recognition processing of the order of the commodity M from the user via the user interface 23 and accepts the order of the commodity M. That is, the processor 31 analyzes the voice acquired through the microphone 18, for example, in a state in which the order can be accepted, to thereby accept the order of the commodity M which is uttered by the user. For example, the processor 31 recognizes a keyword for example, the "commodity name", the "number (plate number)", or the "commodity name and number" from the voice acquired through the microphone 18. If the user says "Cigarettes No. 10, please", the processor 31 acquires information regarding words such as "Cigarettes", "No. 10", and "please" by voice recognition. When "Cigarettes" and "No. 10" are acquired by voice recognition, the processor 31 recognizes that the cigarettes with the plate of No. 10 is ordered. Subsequently, in ACT16, the processor 31 determines whether or not the order of the commodity M is recognized.

If the processor 31 determines that the order of the commodity M is not recognized (NO in ACT16), the processing of the processor 31 returns to ACT14 described above. If the processor 31 determines that the order of the commodity is recognized (YES in ACT16), i.e., the order of the commodity is accepted, the processing of the processor 31 shifts to ACT17. In ACT17, the processor 31 determines whether or not the commodity M whose order has been accepted is the commodity M handled by that robot 1. For example, when the order with the commodity name is accepted, the processor 31 refers to the shelf management database 42 shown in FIG. 5 and determines whether or not the commodity M whose order has been accepted (commodity having the commodity name recognized as voice) is the commodity M arranged on the shelf 4 (commodity handled by the robot). Further, when the order with the number of the plate has been accepted, the processor 31 may determine whether or not the plate of the number with which the order has been accepted is arranged on the shelf 4.

If the commodity M whose order has been accepted is not the handled commodity (NO in ACT17), the processing of the processor 31 shifts to ACT18. In ACT18, the processor 31 performs voice guidance or the like, indicating that the ordered commodity M is not the handled commodity. For example, the processor 31 outputs voice guidance saying "We are sorry to inform you that the ordered commodity M is not handled" through the speaker 17. Further, the processor 31 may display not only the voice guidance but also the guidance indicating that it is not handled on the display device 19. The processor 31 terminates the series of processing for the ordered commodity M when the not-handling guidance is performed. In this case, the processor 31 may return the processing of ACT14 for receiving a next order.

If the commodity M whose order has been accepted (ordered commodity) is handled (YES in ACT17), the processing of the processor 31 shifts to ACT19. In ACT19, the processor 31 determines whether or not a stock (shelf stock) of the ordered commodity M is present on the shelf 4. For example, the processor 31 refers to the shelf management database 42 shown in FIG. 5 and determines whether or not the shelf stock of the ordered commodity M (commodity having the commodity name recognized as voice) is present. Further, the processor 31 may refer to the commodity management database 41 shown in FIG. 4 and determine whether or not the stock of the ordered commodity M is present.

If the processor 31 determines that the stock of the ordered commodity M is not present (NO in ACT19), the processing of the processor 31 shifts to ACT20. In ACT20, the processor 31 performs guidance indicating that the ordered commodity M is not stocked (in a sold out state). For example, the processor 31 outputs voice guidance indicating that the shelf stock of the commodity M is not present, for example, "We are sorry to inform you that the commodity M you ordered is currently sold out" through the speaker 17. Further, the processor 31 may display not only the voice guidance but also guidance indicating that no stocks are present on the display device 19. When the processor 31 performs guidance indicating that no stocks are present, the processor 31 terminates the series of processing for the ordered commodity M. In this case, the processor 31 may return to the processing of ACT14 for receiving a next order.

If the processor 31 determines that the stock of the ordered commodity M is present (YES in ACT19), the processing of the processor 31 shifts to ACT21. In ACT21, the processor 31 verifies whether or not the ordered commodity M has a sale condition (e.g., age restriction). For example, the processor 31 refers to the shelf management database 42 shown in FIG. 5 and verifies whether or not the ordered commodity M has the sale condition. In this embodiment, the cigarettes are assumed as the commodity M arranged on the shelf 4. The cigarettes are the commodity M forbidden to sell to a person under 20-year-old, for example, and thus the ordered commodity M is the commodity M having the sale condition (age restriction).

If the ordered commodity M has the sale condition (YES in ACT21), the processing of the processor 31 shifts to ACT22. In ACT22, the processor 31 executes processing of verifying whether or not the ordered commodity M is allowed to be sold to the user. Here, the description will be made assuming that the ordered commodity M is cigarettes forbidden to be sold to a user under 20-year-old. That is, in a case of accepting the order of the cigarettes, the processor 31 executes processing of verifying whether or not the user is 20-year-old or more (age verification processing).

The age verification processing may be processing of verifying the age on the basis of declaration of the user or may be processing of verifying the age on the basis of an ID card presented by the user. In the former case, the processor 31 requests the user to make an input into a declaration button to declare that the user is 20-year-old or more in the information input device 20. When detecting the input into the button to declare that the user is 20-year-old or more, the processor 31 determines that the commodity M (cigarettes) is allowed to be sold to the user (YES in ACT23). In this case, the processor 31 may take a face image of the user with the camera 12 for verification and save the face image.

Further, in a case of verifying the age on the basis of the ID card, the robot 1 includes a card reader as the information input device 20. In this case, the processor 31 acquires information regarding user's age on the basis of information read by the card reader from the ID card presented by the user. If user's age is 20-year-old or more, the processor 31 determines that the commodity M (cigarettes) is allowed to be sold to the user (YES in ACT23). Further, the processor 31 causes the camera 12 to capture an image of a card surface of the ID card presented by the user. Then, the processor 31 may recognize (acquire) user's age described on the card surface from the image acquired by image-capturing of the camera 12.

It should be noted that in a case of an operation assuming that the user is a registrant (customer) whose age and the like have been registered, the processor 31 may determine which registrant the user is and verify the age. In this case, the processor 31 may perform personal authentication by using information read from a storage medium such as a card presented by the user or using biometric information acquired from the user (e.g., face image obtained by image-capturing of the camera 12).

If it cannot be verified that the ordered commodity M is allowed to be sold to the user (NO in ACT23), the processing of the processor 31 shifts to ACT24. In ACT24, the processor 31 performs guidance indicating that the ordered commodity M is not allowed to be sold. If the order of the cigarettes has been accepted, the processor 31 determines that the cigarettes are not allowed to be sold and performs guidance indicating that the cigarettes are not allowed to be sold if it cannot be verified that the user is 20-year-old or more. For example, the processor 31 outputs voice guidance indicating that the commodity M is not allowed to be sold, for example, "We cannot sell it to you because it cannot be verified that you are 20-year-old or more" through the speaker 17. Further, the processor 31 may display not only the voice guidance but also the guidance indicating that the cigarettes are not allowed to be sold on the display device 19. When the guidance indicating that the cigarettes are not allowed to be sold is performed, the processor 31 terminates the series of processing for the user.

On the other hand, if it can be verified that the ordered commodity M is allowed to be sold to the user (YES in ACT23), the processor 31 starts processing of taking out the ordered commodity M from the shelf 4. Also, if the ordered commodity M does not have the sale condition (NO in ACT21), the processor 31 starts processing of taking out the ordered commodity M from the shelf 4. First of all, in ACT31 of FIG. 7, the processor 31 acquires information (arrangement information) regarding the arrangement position at which the ordered commodity M is arranged on the shelf 4 from the shelf management database 42 (see FIG. 5).

When the arrangement information of the ordered commodity M is acquired, the processing of the processor 31 shifts to ACT32. In ACT32, the processor 31 determines a position (take-out position) to move the distal end portion of the first arm 13A (or the second arm 13B) including the holding mechanism 15 that holds the commodity M. When the processor 31 determines the take-out position, the processing of the processor 31 shifts to ACT33. In ACT33, the processor 31 moves the distal end portion of the first arm 13A (or the second arm 13B) to the determined take-out position. For example, the processor 31 moves the distal end portion of the first arm 13A to that take-out position from the front surface of the arrangement position of the ordered commodity M on the shelf 4 by using a position which is at a predetermined distance as the take-out position. It should be noted that hereinafter, the description will be made assuming that the articulated arm 14 and the holding mechanism 15 of the first arm 13A take out the ordered commodity M. It should be noted that the second arm 13B may perform the operation of the first arm 13A which will be described below.

Further, the movement route of the first arm 13A may be stored in the shelf management database 42 for each commodity M arranged on the shelf 4. In this case, the processor 31 moves the first arm 13A on the basis of the movement route stored in the shelf management database 42. The movement route in which the arm 13A has been moved may be actually recorded (updated or additionally written) in the shelf management database 42 every time take-out of the commodity M is carried out.

When the arm 13A is moved, the processing of the processor 31 shifts to ACT34. In ACT34, the processor 31 captures an image of the image-capturing area including the arrangement position of the ordered commodity M with the arm camera 16 and acquires an image including the arrangement position of the ordered commodity M. When the arm camera 16 acquires the image including the arrangement position of the ordered commodity M, the processing of the processor 31 shifts to ACT35. In ACT35, the processor 31 verifies that the ordered commodity M (take-out target commodity) which can be taken out actually exists on the basis of the image acquired by image-capturing of the arm camera 16. For example, if the order has been accepted with the commodity name, the processor 31 verifies that the ordered commodity M having the commodity name whose order has been accepted actually exists on the shelf 4. That is, the processor 31 extracts the take-out target commodity M from the image acquired by image-capturing of the arm camera 16. If the take-out target commodity M can be extracted, the processor 31 determines that the take-out target commodity M actually exists. If the take-out target commodity M cannot be extracted, the processor 31 determines that the take-out target commodity M is not present on the shelf 4.

If it cannot be verified that the ordered commodity M actually exists on the shelf 4 (NO in ACT36), the processing of the processor 31 shifts to ACT37. In ACT37, the processor 31 informs the user of the fact that the ordered commodity M cannot be taken out. For example, the processor 31 outputs voice guidance, for example, "We are sorry to inform you that the commodity M cannot be identified" through the speaker 17 and terminates the series of processing related to the ordered commodity M.

Further, it can be verified that the ordered commodity M actually exists on the shelf 4 (YES in ACT36), the processing of the processor 31 shifts to ACT38. In ACT38, the processor 31 verifies whether or not the number of the plate P at the position corresponding to the verified ordered commodity M is inconsistent. The processor 31 recognizes the number displayed on the plate P at the position corresponding to the ordered commodity on the basis of the image acquired by image-capturing of the arm camera 16. When the processor 31 recognizes the number displayed on the plate P, the processor 31 verifies whether or not the recognized number is identical to the number (number of the ordered commodity) which should be set to the plate P for the ordered commodity M. That is, the processor 31 determines whether or not the number of the plate P corresponding to the ordered commodity M is identical to the information (number set to the ordered commodity M) stored in the shelf management database 42 (see FIG. 5).

For example, it is assumed that the processor 31 has received an order saying "xxx (commodity name, brand name), please" from the user and has verified that the ordered commodity M having the commodity name of "xxx" actually exists on the shelf 4 (ACT35). In this case, the processor 31 captures an image of an image-capturing area including a position at which the ordered commodity M having the commodity name of "xxx" is placed with the arm camera 16. The processor 31 verifies the number of the plate P mounted corresponding to the ordered commodity M on the basis of the image acquired by image-capturing of the arm camera 16 and verifies whether or not the number of the verified plate P is identical to the number set to the ordered commodity M.

If the number of the plate P corresponding to the ordered commodity M is not identical (YES in ACT38), the processing of the processor 31 shifts to ACT39. In ACT39, the processor 31 informs a manager or an employee of the fact that the number of the plate P is inconsistent. For example, the processor 31 performs informing by sending mail indicating that the number of the plate P corresponding to the commodity M having the commodity name ordered is inconsistent or sending a message to the manager or the employee. Here, the processor 31 verifies that the ordered commodity M having the commodity name whose order has been accepted actually exists on the shelf 4. Therefore, the processor 31 shifts to the processing of ACT40 (see FIG. 8) and takes out the ordered commodity M after the processor 31 informs the manager of the fact that the number of the plate P corresponding to the ordered commodity M is inconsistent.

It should be noted that when the processor 31 accepts the order with the number of the plate without specifying the commodity name, the processor 31 sets the commodity M present at the arrangement position corresponding to the number of the plate as the ordered commodity. In this case, the processor 31 may omit the processing of ACT38 and 39.

Further, when the order including both of the number of the plate P and the commodity name has been accepted, the processor 31 may capture an image of the arrangement position corresponding to the number of the plate P with the arm camera 16. In this case, the processor 31 may verify whether or not the commodity M having the commodity name whose order has been accepted actually exists at the arrangement position corresponding to the plate P having the number (ordered number) ordered on the basis of the image acquired by image-capturing of the arm camera 16. If the ordered commodity M is not absent at the arrangement position corresponding to the plate of the ordered number, the processor 31 may perform guidance indicating that the ordered commodity M is absent to the user.

For example, when an order saying "xxx (commodity name, brand name) No. 10, please" has been accepted, the processor 31 verifies whether or not the commodity M having the commodity name of "xxx" actually exists at the position corresponding to the plate of No. "10". If the commodity M having the commodity name of "xxx" does not actually exist at the position corresponding to the plate of No. "10", the processor 31 may output voice guidance saying "We are sorry to inform you that "xxx" is currently sold out", for example, through the speaker 17.

Further, when an order including both of the number of the plate P and the commodity name has been accepted, the processor 31 may verify matching between the number of the plate P and the commodity name on the basis of the shelf management database 42. For example, when an order saying "xxx (commodity name, brand name) of No. 10, please" has been accepted, the processor 31 verifies whether or not the commodity name of the commodity M placed in the plate P of No. "10" is set as "xxx" in the shelf management database 42. If the commodity name of the commodity M arranged at the arrangement position of the plate P of No. "10" is not "xxx", the processor 31 may output voice guidance saying, for example, "We are sorry to inform you that "xxx" is currently sold out" through the speaker 17.

Figure 8:
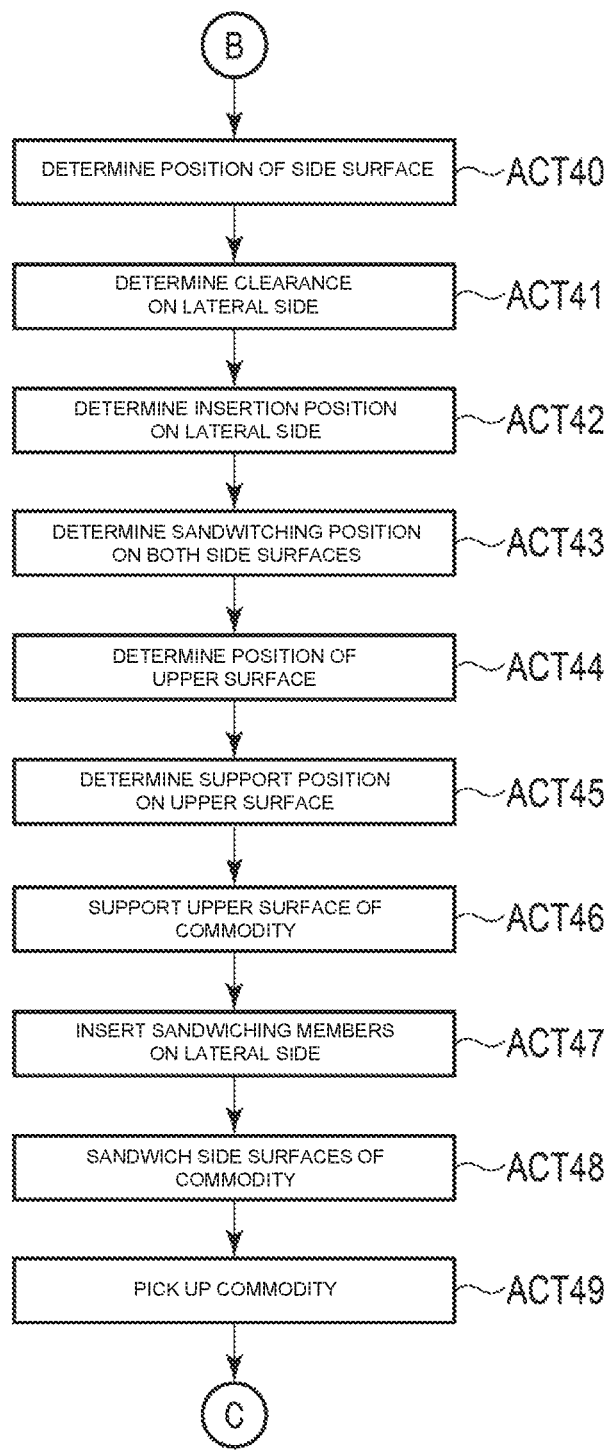
FIG. 8 is a flowchart showing an operation example of the robot that is the commodity take-out apparatus according to the embodiment.
Figure 9:
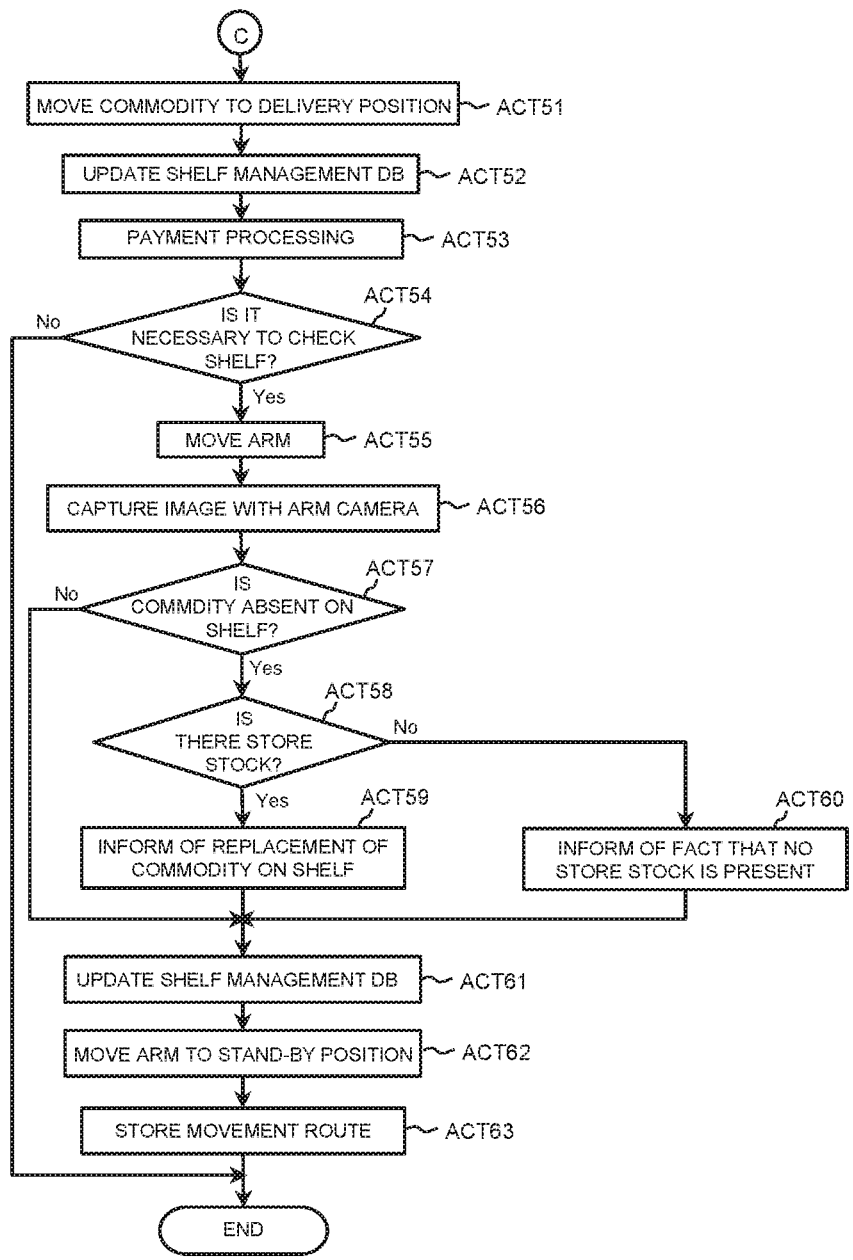
FIG. 9 is a flowchart showing an operation example of the robot that is the commodity take-out apparatus according to the embodiment.

If the processor 31 determines that the number of the plate P corresponding to the ordered commodity M is consistent (NO in ACT38), the processing of the processor 31 shifts to ACT40 of FIG. 8. In ACT40, the processor 31 determines the positions of the both side surfaces in the take-out target commodity M on the basis of the image acquired by image-capturing of the arm camera 16. For example, the processor 31 determines, on the basis of the image acquired by image-capturing of the arm camera 16, either one side surface of the take-out target commodity M as a first reference position (reference surface).

In addition, the processor 31 acquires the width of the take-out target commodity M from the shelf management database 42. On the basis of the width of the commodity M, the processor 31 determines the positions of the both side surfaces of the commodity M by using the either one side surface as a reference.

Subsequently, in ACT41, the processor 31 determines a size of the clearance on the lateral side of the commodity M on the basis of the image acquired by image-capturing of the arm camera 16. For example, the processor 31 calculates, on the basis of the image acquired by image-capturing of the arm camera 16, the size of the clearance from the side surface of the commodity M to the adjacent commodity M. Further, the processor 31 may calculate the size of the clearance by using the position of the plate P as a reference. In addition, the processor 31 may calculate the size of the clearance by using a reference line or a mark displayed on the plate P as a reference.

When the position of the side surface of the commodity M and the size of the clearance are determined, the processing of the processor 31 shifts to ACT42. In ACT42, the processor 31 determines insertion positions for inserting the fingers 15*b* and 15*c* as the holding mechanism 15 on the lateral sides of the commodity M. For example, the processor 31 determines the positions for inserting the fingers 15*b* and 15*c* in accordance with the positions of the side surfaces of the commodity M. Further, the processor 31 may determine the positions for inserting the fingers 15*b* and 15*c* on the lateral sides of the commodity M, considering the sizes of the clearances. For example, the processor 31 may set a middle position of a clearance (between the commodity and the next commodity or wall) on the lateral side of the commodity M as the position for inserting each of the fingers 15*b* and 15*c*. With this configuration, the robot 1 is capable of inserting the fingers 15*b* and 15*c*, considering not only the position of the side surface of the commodity M but also the clearances on the lateral sides of the commodity M.

When the insertion positions for inserting the fingers 15*b* and 15*c* are determined, the processing of the processor 31 shifts to ACT43. In ACT43, the processor 31 determines the positions (holding positions) for setting the fingers 15b and 15c in the both side surfaces of the commodity M in accordance with a depth d of the commodity M. For example, the processor 31 acquires the depth d of the commodity M from the shelf management database 42. The processor 31 determines the holding positions which are the positions for setting the fingers 15b and 15c in order to hold the commodity M in accordance with the position of the side surface of the commodity M and the depth.

Subsequently, in ACT44, the processor 31 determines the position of the upper surface of the take-out target commodity M on the basis of the image acquired by image-capturing of the arm camera 16. For example, the processor 31 determines a second reference position for determining the position of the upper surface of the take-out target commodity M on the basis of the image acquired by image-capturing of the arm camera 16. The second reference position only needs to be a position which can determine the position of the upper surface on the basis of the size of the commodity M and the like. The second reference position may be an upper end portion Pt of the plate P (see FIG. 10), the lower end portion of the plate, the reference line for displaying the plate P, the mark, or the like. When the processor 31 determines the second reference position, the processor 31 determines the position of the upper surface of the commodity M in accordance with the distance from the second reference position on the basis of the size of the commodity M, the position of the plate, and the like.

Figure 10:
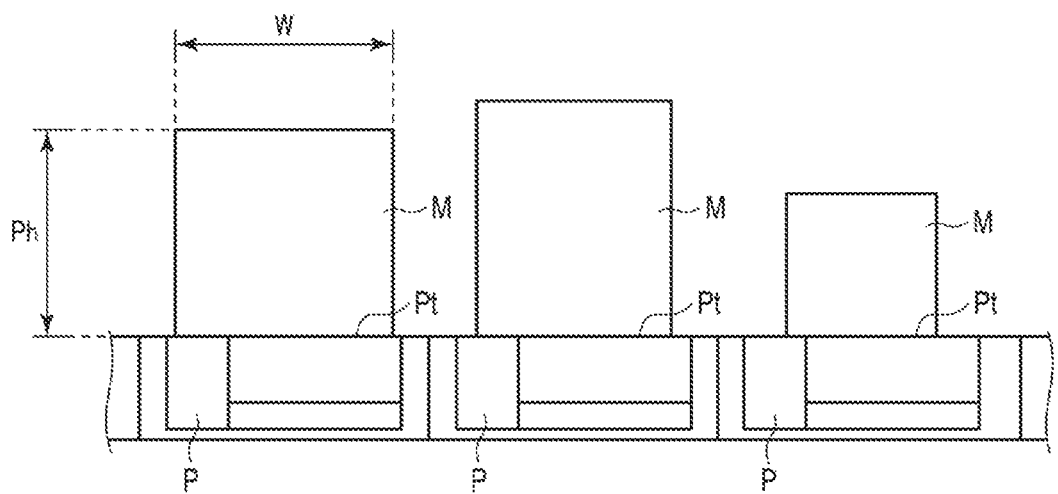
FIG. 10 is a diagram showing a state in which commodities to be held by the robot that is the commodity take-out apparatus according to the embodiment are placed on a shelf.

FIG. 10 is a diagram for describing a relationship between the commodity M arranged on the shelf 4 and the plate P. In this embodiment, the shelf 4 is provided with the plate P in front of one of the commodities M aligned and arranged from the front to the deep side. Therefore, a lower part of the commodity M which is the take-out target in the front, as viewed from the first arm 13A, is hidden by the plate P. The holding mechanism 15 of the first arm 13A holds the take-out target commodity M above the plate P.

In FIG. 10, when the upper end portion Pt of the plate P is used as the reference position, the upper surface of the commodity M is at a position upwardly spaced from the upper end portion Pt of the plate P by a height ph. The height ph is calculated by subtracting the height of the plate P from the height of the commodity M. Such a height ph only needs to be stored in association with the commodity M in the shelf management database 42 or the like. It should be noted that if the reference line or the like for displaying the plate P is the reference position, information indicating the height from the reference position to the upper surface of the commodity M may be stored in the shelf management database 42.

When the position of the upper surface of the commodity is determined, the processing of the processor 31 shifts to ACT45 of FIG. 8. In ACT45, the processor 31 determines an upper surface support position (position for setting the finger 15a) for the finger 15a to support the upper surface of the commodity M. The processor 31 determines the upper surface support position for setting the finger 15a in accordance with the position of the upper surface of the commodity M and the depth d. For example, the processor 31 acquires the depth of the commodity M from the shelf management database 42. The processor 31 determines, in accordance with the position of the upper surface of the commodity M and the depth, the position for setting the finger 15a for supporting the commodity M held by the fingers 15b and 15c.

When the upper surface support position for setting the finger 15a as the holding mechanism 15 is determined, the processing of the processor 31 shifts to ACT46. In ACT46, the processor 31 sets the finger 15a to the upper surface support position in the upper surface of the commodity M. The processor 31 operates the finger 15a in the holding mechanism 15 and place the distal end portion of the finger 15a at the upper surface support position in the upper surface of the commodity M. In this case, the processor 31 may operate the articulated arm 14 in a manner that depends on needs. It should be noted that the processor 31 arranges the fingers 15b and 15c at the insertion positions in a state in which the distal end portion of the finger 15a is arranged at the upper surface support position.

When the finger 15a is set at the upper surface support position, i.e., the upper surface of the commodity M is supported by the finger 15a, the processing of the processor 31 shifts to ACT47. In ACT47, the processor 31 inserts the fingers 15b and 15c on the lateral sides of the commodity M from the above-mentioned insertion position. The processor 31 inserts the distal end portions of the fingers 15b and 15c on a deep side to positions corresponding to the holding positions on the both side surfaces of the commodity M, at which the fingers 15b and 15c are set. When the fingers 15b and 15c are inserted to the positions corresponding to the holding positions, the processing of the processor 31 shifts to ACT48. In ACT48, the processor 31 sets the fingers 15b and 15c at the holding positions on the both side surfaces of the commodity M and sandwiches the both side surfaces of the commodity M. When the fingers 15b and 15c sandwich the commodity M, the processing of the processor 31 shifts to ACT49. In ACT49, the processor 31 drives the articulated arm 14 of the arm 13A to pick up the commodity M sandwiched by the fingers 15b and 15c from the shelf 4.

Figure 11:
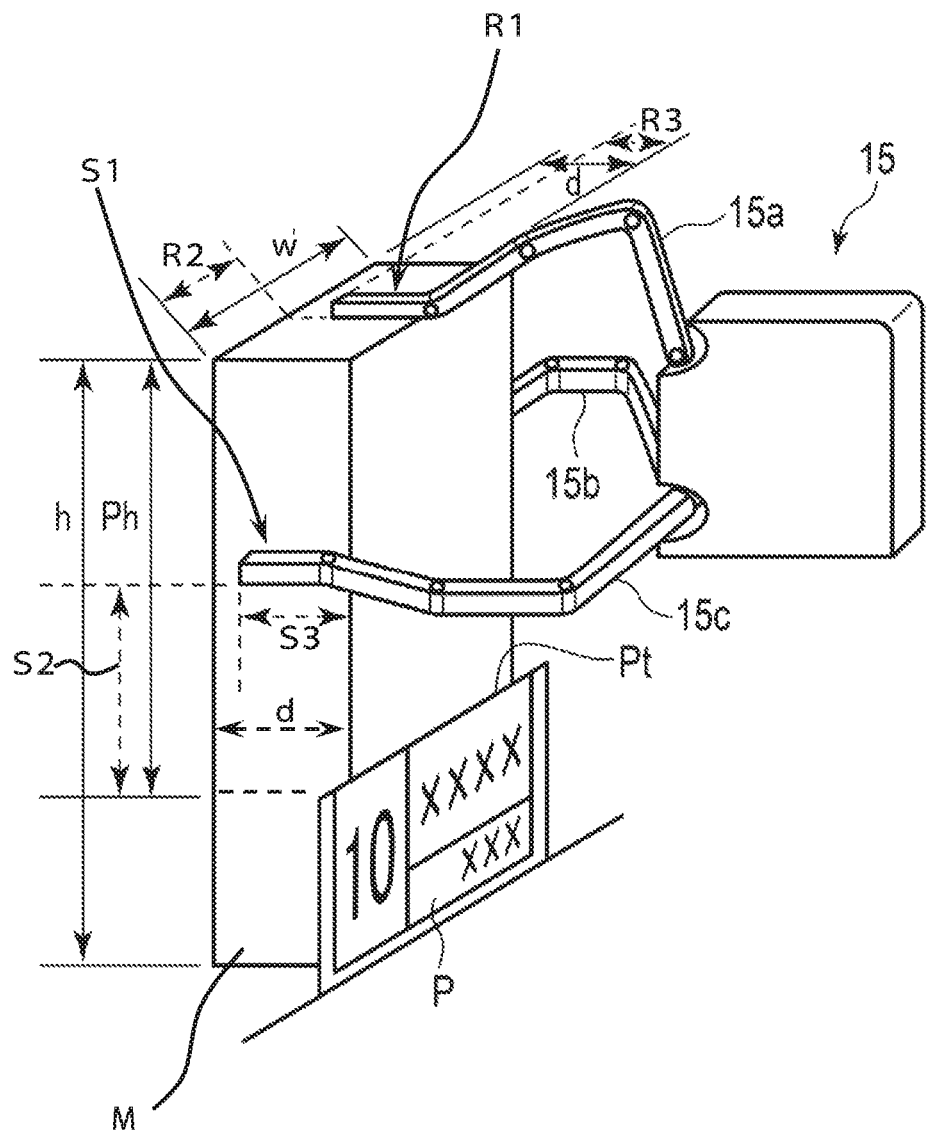
FIG. 11 is a diagram showing a state in which a holding mechanism of the robot that is the commodity take-out apparatus according to the embodiment holds a commodity.

FIG. 11 is a diagram showing a state in which the commodity M is held by the holding mechanism 15 of the first arm 13A. As shown in FIG. 11, the holding mechanism 15 of the first arm 13A sandwiches the both side surfaces of the commodity M with the fingers 15b and 15c while pressing and supporting the upper surface of the commodity M with the distal end portion of the finger 15a. A position (support position R1) at which the finger 15a supports the upper surface of the commodity M is set to a predetermined position on the upper surface of the commodity M as shown in FIG. 11. For example, the position of the support position R1 in a width w direction is a position in a width R2 in FIG. 11. The width R2 is a distance from one side surface of the commodity M and is a distance shorter than the width w. It should be noted that the width w is a width of the commodity M and is stored in the shelf management database 42 shown in FIG. 5 as the size of the commodity M. Further, the position of the support position R1 in a depth d direction is a position at which the distal end portion of the finger 15a reaches a position in the depth R3. The depth R3 is a distance from a surface (surface on the front side) on a plate P side of the commodity M and is a distance shorter than a depth d. It should be noted that the depth d is a depth of the commodity M and is stored in the shelf management database 42 shown in FIG. 5 as the size of the commodity M. That is, the support position R1 is a position depending on the width R2 and the depth R. It should be noted that a support position S1 at which the finger 15a supports the upper surface of the commodity M is set in accordance with characteristics of each commodity M such as a arrangement state of the commodity M, the weight of the commodity M, and the rigidity of the outer shape of the commodity M. The positions (holding positions S1) at which the fingers 15b and 15c sandwich the commodity M are each set between the upper end portion Pt of the plate P to the upper surface of the commodity M. For example, the position of the holding position S1 in a height h direction is a position in the height S2 in FIG. 11. The height S2 is a height from the upper end portion Pt of the plate P and is a height lower than a height Ph. It should be noted that the height h is a height of the commodity M and is stored in the shelf management database 42 shown in FIG. 5 as the size of the commodity M. Further, as described above, the height Ph is a height between the upper end portion Pt of the plate P to the upper surface of the commodity M. Further, the position of the holding position S1 in the depth d direction is a position at which the distal end portion of the finger 15c (or 15b) reaches a position in a depth S3. The depth S3 is a distance from the surface of the commodity M, which is on the plate P side, and is a distance shorter than the depth d. That is, the holding position S1 is a position depending on the height S2 and the depth S3. It should be noted that the holding positions S1 at which the fingers 15b and 15c sandwich the both side surfaces of the commodity M are set in accordance with characteristics of each commodity M such as the arrangement state of the commodity M, the weight of the commodity M, and the rigidity of the outer shape of the commodity M. It should be noted that on the shelf 4, the line for the taken out commodity M is pushed from the back by an amount corresponding to the taken out commodity M and a commodity M arranged next to the taken out commodity M is held in contact with the plate P.

When the commodity M held by the holding mechanism 15 is picked up (retained), the processing of the processor 31 shifts to ACT51. In ACT51, the processor 31 controls the arm drive mechanism 54 to operate the articulated arm 14 of the first arm 13A and move the commodity M to the delivery position. For example, the processor 31 controls the arm drive mechanism 54 to transport the commodity M held by the holding mechanism 15 of the first arm 13A onto the cash register table 3 as the delivery position. In this case, the first arm 13A moves the commodity M, which held by the holding mechanism 15 and picked up from the shelf 4, to the cash register table 3. With this configuration, the ordered commodity M which has been present on the shelf 4 is taken out by the first arm 13A and is transported onto the cash register table 3. It should be noted that the delivery position to which the commodity M taken out from the shelf 4 moves is not limited to an area on the cash register table 3. For example, the processor 31 may perform control to directly deliver the commodity M held by the holding mechanism 15 of the first arm 13A to the user.

When the commodity M is transported to the delivery position, the processing of the processor 31 shifts to ACT52. In ACT52, the processor 31 stores information regarding the taken out commodity M (commodity placed on the cash register table 3) in the shelf management database 42. For example, the processor 31 stores information indicating the take-out position at which the commodity M has been taken out in the memory 32. Further, the processor 31 may store information regarding the take-out position at which the commodity M has been taken out and the like in the shelf management database 42 in association with the commodity M subjected to the take-out processing.

When the commodity M is moved to the delivery position, the processing of the processor 31 shifts to ACT53. In ACT53, the processor 31 notifies the payment apparatus 2 of information indicating the taken out commodity M (commodity placed on the cash register table 3). With this configuration, the payment apparatus 2 acquires the information regarding the commodity M taken out from the shelf 4 and placed on the cash register table 3 by the robot 1 as the information regarding the payment target commodity M. The payment apparatus 2 is capable of executing payment processing on the commodity price including the commodity M taken out by the robot 1 from the shelf 4 on the basis of the information regarding the commodity M from the processor 31.

It should be noted that the processor 31 may perform control not to release the commodity M held by the holding mechanism 15 (commodity taken out from the shelf 4) until the payment processing of the payment apparatus 2 is completed. That is, rather than immediately placing the taken out commodity M on the cash register table 3 from the shelf 4, the holding mechanism 15 may place the commodity M on the cash register table 3 after the payment processing of the payment apparatus 2 is completed.

When the commodity M is moved to the delivery position, the processing of the processor 31 shifts to ACT54. In ACT54, the processor 31 determines whether or not it is necessary to perform shelf check processing of checking the state and the like of the shelf after the commodity M is taken out. For example, if the user detected by the sensor 11 has gone, it is predicted that it may be impossible to directly receive a next order of the commodity M from the user. Therefore, the processor 31 may perform shelf check processing if the user detected by the sensor 11 has gone. In this case, the processor 31 may be set not to execute shelf check processing while the sensor 11 detects the user.

If it is unnecessary to execute shelf check processing (NO in ACT54), the processing of the processor 31 is terminated. If it is necessary to execute shelf check processing (YES in ACT54), the processing of the processor 31 shifts to ACT55. In ACT55, the processor 31 moves the arm camera 16 for capturing an image of the position at which the taken out commodity M has been present with the arm camera 16. In the configuration example shown in FIG. 1, the arm camera 16 is provided to the distal end portion of the first arm 13A together with the holding mechanism 15. Therefore, the processor 31 moves the arm camera 16 (distal end portion of the first arm 13A) to the take-out position at which the commodity M has been taken out. That is, the arm camera 16 at the distal end portion of the first arm 13A is moved to the take-out position at which the take-out of the commodity M has been performed in order to capture an image of the position at which the taken out commodity M has been present.

When the arm camera 16 is moved to the take-out position, the processing of the processor 31 shifts to ACT56. In ACT56, the processor 31 causes the arm camera 16 to capture an image of the position (take-out position) at which the commodity M has been present. When the arm camera 16 acquires an image by capturing the image of the take-out position, the processing of the processor 31 shifts to ACT57. In ACT57, the processor 31 determines whether or not the next commodity M is present at the position at which the taken out commodity M has been present on the basis of the image acquired by image-capturing of the arm camera 16.

If the next commodity M is present at the position at which the taken out commodity M has been present (NO in ACT57), the processing of the processor 31 shifts to ACT61 to be described later. If the next commodity M is not present at the position at which the taken out commodity M has been present (YES in ACT57), the processing of the processor 31 shifts to ACT58. In ACT58, the processor 31 determines whether or not a stock (hereinafter, referred to as a store stock) of a commodity identical to the taken out commodity M, which is to be replaced on the shelf 4, is present. For example, the processor 31 refers to the commodity management database 41 shown in FIG. 4 and determines whether or not the store stock for the taken out commodity M is present.

If the processor 31 determines that the store stock is present (YES in ACT58), the processing of the processor 31 shifts to ACT59. In ACT59, the processor 31 informs the manager or the employee of the fact that the commodity M is to be replaced on the shelf 4. For example, the processor 31 informs the manager or the employee of the fact that the commodity M is to be replaced on the shelf 4 or provides the manager or the employee with information indicating the commodity M to be replaced on the shelf 4 by mail or a message. As a specific example, the processor 31 provides the manager or the employee with mail or a message saying "Commodity shelf has no xxx. Please replenish it", for example. Then, after this information, the processing of the processor 31 shifts to ACT61 to be described later.

If the processor 31 determines that the store stock is not present (NO in ACT58), the processing of the processor 31 shifts to ACT60. In ACT60, the processor 31 informs the manager or the employee of the fact that the store stock for the taken out commodity M is not present. For example, the processor 31 informs the manager or the employee of the fact that the commodity M is not present on the shelf 4 and the store stock is also not present by mail or a message. As a specific example, the processor 31 provides the manager or the employee with mail or a message saying "xxx is not present on the commodity shelf nor in stock. Please order it", for example. Then, after this information, the processing of the processor 31 shifts to ACT6.

In ACT61, the processor 31 stores information indicating the presence/absence of that M on the shelf 4 as the shelf stock in the shelf management database 42. For example, if the next commodity M is present at the position at which the taken out commodity M has been present, the processor 31 stores (updates) the presence of the shelf stock for the taken out commodity M in the shelf management database 42. Further, if the next commodity M is not absent at the position at which the taken out commodity M has been present, the processor 31 stores (updates) the absence of the shelf stock for the taken out commodity M in the shelf management database 42.

Moreover, in ACT62, after the processor 31 captures an image of the position at which the commodity M has been present with the arm camera 16, the processor 31 moves the first arm 13A from the take-out position to a predetermined stand-by position. For example, the processor 31 calculates a route (driving procedure for the arm 13A) for the first arm 13A to move from the take-out position to the stand-by position. The processor 31 moves the first arm 13A to the stand-by position, using the calculated route. Subsequently, in ACT63, the processor 31 stores the route to move the first arm 13A from the take-out position to the stand-by position in the shelf management database 42.

The robot 1 causes the first arm 13A to stand by at the predetermined stand-by position under the stand-by state. Therefore, when the robot 1 receives a next order from the user, the robot 1 moves the first arm 13A from the stand-by position to a take-out position of the next ordered commodity M. If an identical commodity M (commodity having an identical commodity name) is at substantially the same take-out position, a route opposite to the route to move from the take-out position to the stand-by position can be a movement route for moving from the stand-by position to the take-out position. The shelf management database 42 stores such a movement route from the take-out position to the stand-by position in advance. With this configuration, if the robot 1 subsequently takes out the identical commodity M, the robot 1 is enabled to determine a movement route to move the arm 13A on the basis of the route used in the past.

In the above-mentioned operation, the robot 1 can take out the commodity M ordered by the user from the shelf 4 and can also perform payment processing of the taken out commodity M in cooperation with the payment apparatus 2. Further, the robot 1 can perform check of the sale condition such as verification of the age of the user whom the commodity M is delivered and can assist the work of suitably selling various commodities M. In addition, the robot 1 can check stocks on the shelf and stocks at the store for the commodity M to be taken out and can assist the work of replacing the commodity M on the shelf, the work of ordering the commodity M, and the like.

Modified Example

Although the operation of taking out the commodity M placed on the shelf 4 has been described in the above-mentioned embodiment, the robot 1 may perform an operation of taking out each of the commodities M suspended with hangers or the like. It should be noted that the robot 1 that is a commodity take-out apparatus according to a modified example may be similar to the above-mentioned configuration as shown in FIGS. 1 to 3.

Figure 12:
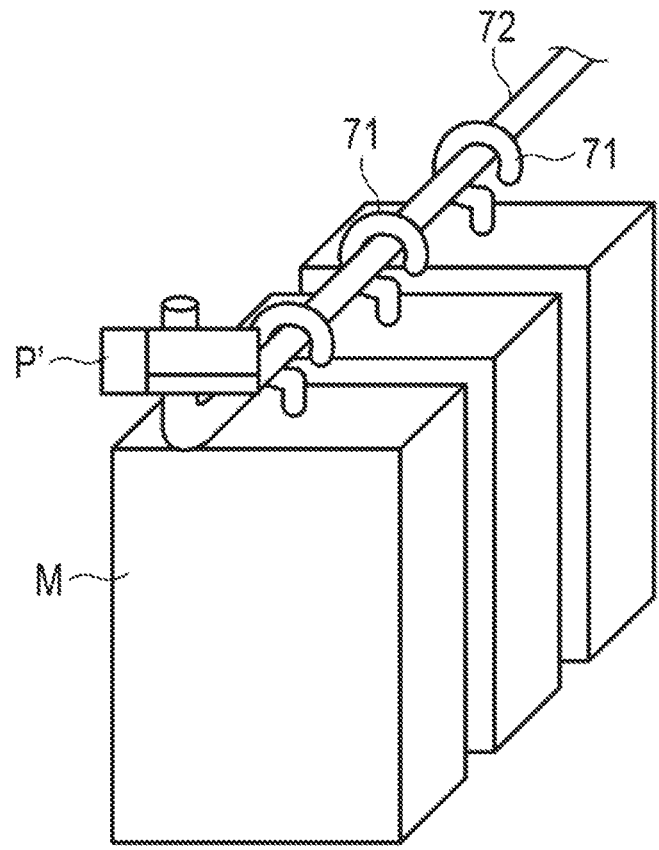
FIG. 12 is a diagram showing an example in which the robot that is the commodity take-out apparatus according to the embodiment suspends commodities to be take-out targets.

FIG. 12 is a diagram showing an example of the commodities M suspended with the hangers. In the example shown in FIG. 12, hangers 71 attached to the respective commodities M are suspended by a support bar 72. The single support bar 72 suspends the identical commodities M arranged from the front to the deep side. Further, the support bar 72 is obliquely mounted with the front lowered with respect to a direction of gravity. Further, an end portion on the front side of the support bar 72 is formed to be bent upward. With this configuration, the respective commodities M suspended by the support bar 72 are arranged by their own weight while being biased to the front side. Further, the support bar 72 is provided with a plate P' corresponding to the plate P shown in FIG. 1 at such a position that the plate P' can be seen from the front.

Figure 13:
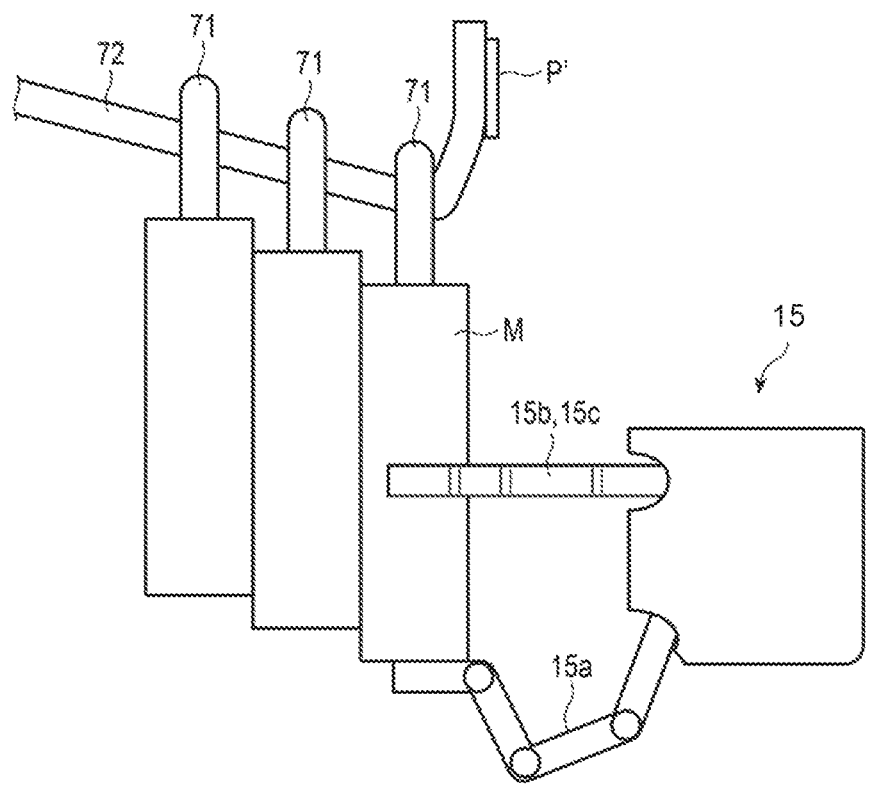
FIG. 13 is a diagram showing an example in which the robot that is the commodity take-out apparatus according to the embodiment suspends the commodities to be the take-out targets.

FIG. 13 is a diagram showing a state in which the commodities M shown in FIG. 12 are held by the holding mechanism 15 (15a-15c). The system controller 21 of the robot 1 may take out the suspended commodities M by executing the processing of ACT40 to 49 described above. It should be noted that regarding the suspended commodities M, not the upper surface of the commodity M to be the take-out target but the lower surface is supported by the finger 15a as shown in FIG. 13.

That is, the processor 31 determines positions of the both side surfaces in the take-out target commodity M and a size of the clearance on the basis of the image acquired by image-capturing of the arm camera 16. The processor 31 determines insertion positions for inserting the fingers 15b and 15c as the holding mechanism 15 on the lateral sides of the commodity M in accordance with the positions of the both side surfaces of the commodity M and the size of the clearance. In addition, the processor 31 determines a position of the lower surface in the take-out target commodity M on the basis of the image acquired by image-capturing of the arm camera 16. Also in this case, the processor 31 may determine the reference position for determining the position of the lower surface in the image acquired by image-capturing of the arm camera 16 and determine the position of the lower surface on the basis of the size of the commodity M and the like. For example, the reference position only needs to be the upper end portion or the lower end portion of the plate P', the reference line or the mark to be displayed on the plate P', or the like.

The processor 31 determines a lower-surface support position (position for setting the finger 15a) on the lower surface of the commodity M and supports the lower surface with the finger 15a. Further, the processor 31 inserts the fingers 15b and 15c on lateral side of the commodity M from the insertion positions and sandwiches the both side surfaces of the commodity M at holding positions determined in accordance with the depth of the commodity M. With this configuration, the holding mechanism 15 reliably holds the commodity M by sandwiching the both side surfaces of the commodity M with the fingers 15b and 15c while supporting the lower surface with the finger 15a as shown in FIG. 13. When holding the suspended commodity M with the holding mechanism 15, the processor 31 drives the articulated arm 14 to detach the hanger 71 of the held commodity M from the support bar 72 and pick up the commodity M. In accordance with the above-mentioned operation of the modified example, the robot 1 is also enabled to reliably take out the commodity M suspended with the support bar with the hanger or the like.

As described above, the robot that is the commodity take-out apparatus according to the embodiment includes the camera, the controller, the arm, and the holding mechanism. The controller determines the reference position in the commodity M on the basis of the image acquired by image-capturing of the camera and determines the positions of the both side surfaces of the commodity M on the basis of the size information of the commodity M by using the reference position as a reference. The holding mechanism moves the distal end portion to the front surface of the take-out target commodity M with the arm and inserts the holding member on the lateral sides of the take-out target commodity M of which the positions of both side surfaces have been determined, and then holds the take-out target commodity M. With this configuration, the robot as the commodity take-out apparatus is capable of reliably taking out the commodity M ordered from the user. As a result, the robot can assist automation of the payment processing for the commodity M by the payment apparatus 2.

Further, the robot that is the commodity take-out apparatus according to the embodiment takes out the commodity M from the arrangement position, and then captures an image of the arrangement position at which the commodity M has been taken out and verifies whether or not the commodity M is present at the arrangement position. If the commodity M is not present at the arrangement position, the commodity take-out apparatus informs the manager or the employee of replacement of the commodity M at the arrangement position if the store stock is present and informs the manager or the employee of the fact that the stock is not present if even the store stock is not present. With this configuration, the robot that is the commodity take-out apparatus can assist commodity management depending on stocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity take-out apparatus configured to move a take-out target commodity of a plurality of commodities which is arranged at a predetermined commodity arrangement position from the commodity arrangement position to a predetermined destination position, the apparatus comprising:
    a camera that captures an image of an image-capturing area including the take-out target commodity and acquires an image of the take-out target commodity;
    an arm including a distal end portion that is three-dimensionally movable between the commodity arrangement position and the destination position;
    a holding mechanism which is provided to the distal end portion of the arm and includes a holding member that holds the take-out target commodity from both side surfaces; and
    a controller that
        determines a reference position in the take-out target commodity on a basis of the image acquired by the camera,
        determines positions of the both side surfaces of the take-out target commodity on a basis of a size of the take-out target commodity, using the reference position as a reference, and
        operates the arm and the holding mechanism to thereby move the holding member of the holding mechanism on both lateral sides of the take-out target commodity on a basis of the determined positions of the both side surfaces of the take-out target commodity and cause the holding member to hold the take-out target commodity, wherein
    the controller further
        determines a size of a clearance present on the both lateral sides of the take-out target commodity on a basis of the image acquired by the camera, and
        determines an insertion position for inserting the holding member into the clearance in accordance with the determined size of the clearance, and
    the holding mechanism is operated by the controller to insert the holding member at the determined insertion position and hold the take-out target commodity with the holding member.

2. The commodity take-out apparatus according to claim 1, wherein
    the holding mechanism
        includes a pair of sandwiching members as the holding member, and
        is operated by the controller to insert the pair of sandwiching members on the both lateral sides of the take-out target commodity and sandwich the take-out target commodity with the pair of sandwiching members.

3. The commodity take-out apparatus according to claim 2, wherein
    the controller further determines a position on an upper surface or a lower surface of the take-out target commodity, and
    the holding mechanism
        further includes a supporting member that supports the upper surface or the lower surface of the take-out target commodity,
        is controlled by the controller to move the supporting member to the determined position of the upper surface or the lower surface of the take-out target commodity and support the determined position of the upper surface or the lower surface with a supporting member, and sandwiches the take-out target commodity supported by the supporting member from the both side surfaces with the pair of sandwiching members.

4. The commodity take-out apparatus according to claim 1, wherein the controller operates the arm to thereby take out the take-out target commodity held by the holding mechanism from the commodity arrangement position, determines whether or not a commodity identical to the take-out target commodity is present at the commodity arrangement position on a basis of the image acquired by the camera after the take-out target commodity is taken out from the commodity arrangement position, determines whether or not a stock commodity to be replaced at the commodity arrangement position is present if the controller determines that the identical commodity is not present at the commodity arrangement position, and informs of an absence of the stock commodity if the controller determines that the stock commodity to be replaced is not present.

5. The commodity take-out apparatus according to claim 1, wherein the camera is mounted on the holding mechanism, and the holding member and the camera are three-dimensionally movable due to movement of the distal end portion of the arm.

6. The commodity take-out apparatus according to claim 5, further comprising a user interface for inputting information regarding the take-out target commodity, wherein the controller operates the arm on a basis of the information regarding the take-out target commodity which is input via the user interface.

7. The commodity take-out apparatus according to claim 6, further comprising a management database for managing a plurality of commodities to be arranged at the commodity arrangement position, wherein the management database stores information regarding a movement route for moving the arm for each of the plurality of commodities, and the controller determines the movement route by referencing the management database on a basis of the information regarding the take-out target commodity which is input via the user interface, and operates the arm on a basis of the determined movement route.

8. The commodity take-out apparatus according to claim 7, wherein the management database stores a size of a commodity for each of the plurality of commodities, and the controller determines a size of the take-out target commodity by referencing the management database on a basis of the information regarding the take-out target commodity which is input via the user interface, and determines positions of the both side surfaces of the take-out target commodity on a basis of the determined size of the take-out target commodity.

9. The commodity take-out apparatus according to claim 7, wherein the management database stores a sale condition of a commodity for each of the plurality of commodities, and the controller determines a sale condition of the take-out target commodity by referencing the management database on a basis of the information regarding the take-out target commodity which is input via the user interface, and determines whether or not to operate the arm for taking out the take-out target commodity from the commodity arrangement position on a basis of the determined sale condition of the take-out target commodity.

10. A commodity take-out apparatus configured to move a take-out target commodity of a plurality of commodities which is arranged at a predetermined commodity arrangement position from the commodity arrangement position to a predetermined destination position, the apparatus comprising:

a camera that captures an image of an image-capturing area including the take-out target commodity and acquires an image of the take-out target commodity;

an arm including a distal end portion that is three-dimensionally movable between the commodity arrangement position and the destination position;

a holding mechanism which is provided to the distal end portion of the arm and includes a holding member that holds the take-out target commodity from both side surfaces; and a controller that determines a reference position in the take-out target commodity on a basis of the image acquired by the camera, determines positions of the both side surfaces of the take-out target commodity on a basis of a size of the take-out target commodity, using the reference position as a reference, and operates the arm and the holding mechanism to thereby move the holding member of the holding mechanism on both lateral sides of the take-out target commodity on a basis of the determined positions of the both side surfaces of the take-out target commodity and cause the holding member to hold the take-out target commodity, wherein the controller operates the arm to thereby take out the take-out target commodity held by the holding mechanism from the commodity arrangement position, determines whether or not a commodity identical to the take-out target commodity is present at the commodity arrangement position on a basis of the image acquired by the camera after the take-out target commodity is taken out from the commodity arrangement position, determines whether or not a stock commodity to be replaced at the commodity arrangement position is present if the controller determines that the identical commodity is not present at the commodity arrangement position, and informs of an absence of the stock commodity if the controller determines that the stock commodity to be replaced is not present.

11. A commodity take-out apparatus configured to move a take-out target commodity of a plurality of commodities which is arranged at a predetermined commodity arrangement position from the commodity arrangement position to a predetermined destination position, the apparatus comprising:
- a camera that captures an image of an image-capturing area including the take-out target commodity and acquires an image of the take-out target commodity;
- an arm including a distal end portion that is three-dimensionally movable between the commodity arrangement position and the destination position;
- a holding mechanism which is provided to the distal end portion of the arm and includes a holding member that holds the take-out target commodity from both side surfaces; and
- a controller that
  - determines a reference position in the take-out target commodity on a basis of the image acquired by the camera,
  - determines positions of the both side surfaces of the take-out target commodity on a basis of a size of the take-out target commodity, using the reference position as a reference, and
  - operates the arm and the holding mechanism to thereby move the holding member of the holding mechanism on both lateral sides of the take-out target commodity on a basis of the determined positions of the both side surfaces of the take-out target commodity and cause the holding member to hold the take-out target commodity, wherein the holding mechanism
  - includes a pair of sandwiching members as the holding member, and
  - is operated by the controller to insert the pair of sandwiching members on the both lateral sides of the take-out target commodity and sandwich the take-out target commodity with the pair of sandwiching members, the controller further determines a position on an upper surface or a lower surface of the take-out target commodity, and the holding mechanism
  - further includes a supporting member that supports the upper surface or the lower surface of the take-out target commodity,
  - is controlled by the controller to move the supporting member to the determined position of the upper surface or the lower surface of the take-out target commodity and support the determined position of the upper surface or the lower surface with a supporting member, and
  - sandwiches the take-out target commodity supported by the supporting member from the both side surfaces with the pair of sandwiching members.

* * * * *